United States Patent [19]
Iizuka et al.

[11] Patent Number: 6,130,782
[45] Date of Patent: Oct. 10, 2000

[54] BEAM SPLITTING ELEMENT INCLUDING A CORRUGATED-SURFACE-DIFFRACTION-GRADING

[75] Inventors: Takashi Iizuka; Masato Noguchi, both of Saitama-ken, Japan

[73] Assignee: Asahi Kogaku Kogyo Kabushiki Kaisha, Tokyo, Japan

[21] Appl. No.: 09/265,896

[22] Filed: Mar. 11, 1999

[30] Foreign Application Priority Data

Mar. 13, 1998 [JP] Japan .................... 10-063755

[51] Int. Cl.[7] .............. G02B 27/10; G02B 5/18
[52] U.S. Cl. .............. 359/619; 359/574; 359/570; 359/569
[58] Field of Search .............. 359/619, 629, 359/639, 640, 569, 570, 572, 574, 575

[56] References Cited

U.S. PATENT DOCUMENTS 5,574,597  11/1996  Kataoka .............. 359/569
6,021,000  2/2000   Iizuka et al. .............. 359/574

FOREIGN PATENT DOCUMENTS 5323110   12/1993  Japan .
7225305   8/1995   Japan .
10-26706  1/1998   Japan .
10-78504  3/1998   Japan .

OTHER PUBLICATIONS

Optical Engineering, vol. 34 No. 12,;"Continuous–Relief Fan–Out Elements With Optimized Fabrication Tolerances," pp. 3456–3464; published in Dec., 1995.

Applied Optics, vol. 34, No. 14; "Interferometric Fabrication Of Modulated Submicrometer Gratings In Photoresist;" pp. 2540–2547; published in May 1995.

*Primary Examiner*—Ricky Mack
*Attorney, Agent, or Firm*—Greenblum & Bernstein, P.L.C.

[57] ABSTRACT

A beam splitting element includes a transparent substrate and a diffractive grating formed on the substrate for dividing an incident beam into a plurality of diffracted beams. The diffractive grating has a plurality of identically formed belt-shaped phase patterns that are arranged in parallel lines at equal pitches. The phase pattern has a sectional shape in a plane perpendicular to the parallel lines that causes nonlinear phase difference to the beam passing therethrough within one pitch. Further, the adjacent phase patterns are connected without phase gaps at the boundaries therebetween.

18 Claims, 16 Drawing Sheets

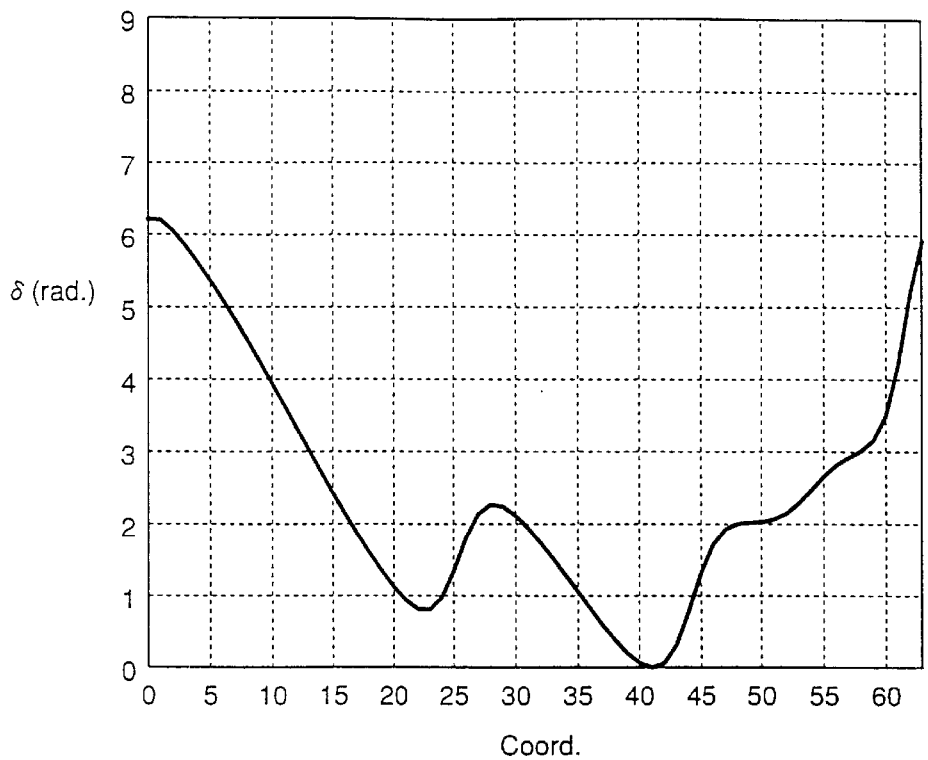
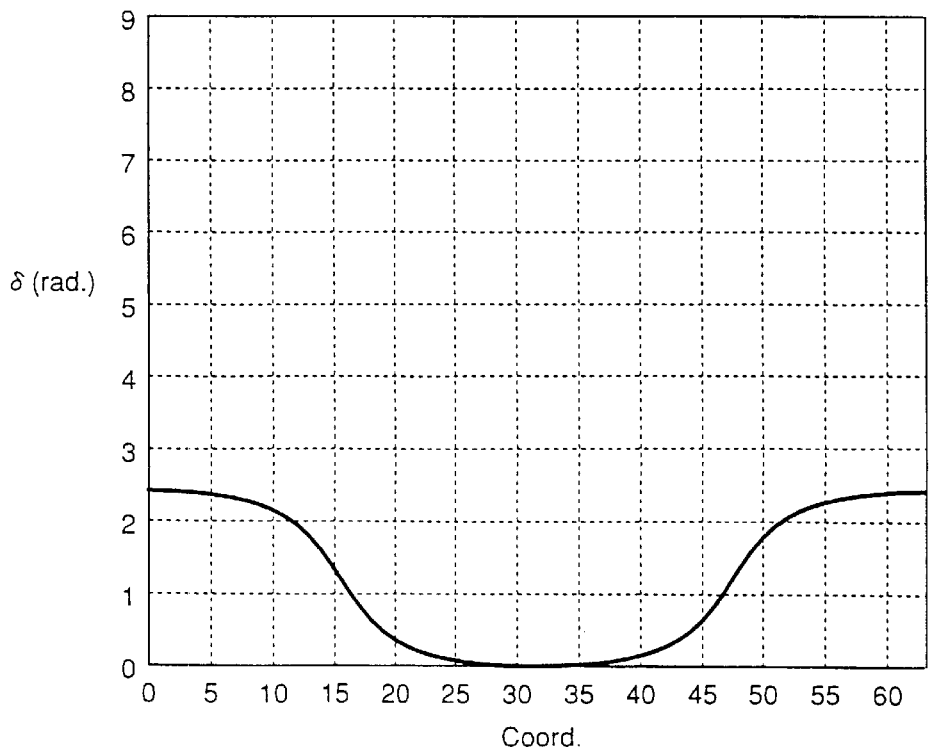

BEAM SPLITTING ELEMENT INCLUDING A CORRUGATED-SURFACE-DIFFRACTION-GRADING

BACKGROUND OF THE INVENTION

The present invention relates to a beam splitting element that divides an incident beam into a plurality of diffracted beams.

Examples of conventional beam splitting elements are disclosed in Japanese patent provisional publications Nos. HEI 5-323110 and HEI 7-225305. The conventional beam splitting element as disclosed in the publications is provided with diffractive grating having a plurality of elongated grooves and raised portions (ridges) formed in parallel and alternately on a glass substrate. Each of the grooves and the raised portions has a rectangular sectional shape in a plane that is perpendicular to the direction in which the grooves are elongated. Heights and depths of the raised portions and the grooves are constant, while the pitches of the grooves and/or the raised portions are uneven.

However, the conventional beam splitting element as a relatively low diffraction efficiency, which loses energy of the incident light beam. The diffraction efficiencies of the embodiments are in a range of 70%–85% in the publication 5-323110, and 81% in the publication 7-225305.

SUMMARY OF THE INVENTION

It is therefore an object of the present invention to provide an improved beam splitting element, which has higher diffraction efficiency than a conventional element.

For the above object, according to the present invention, there is provided a beam splitting element, which includes:
a transparent substrate; and
a diffractive grating formed on the substrate for dividing an incident beam into a plurality of diffracted beams. The diffractive grating has a corrugated surface having a plurality of periodical patterns arranged in parallel at a predetermined fixed pitch.

The phase pattern has a sectional shape in a plane perpendicular to the parallel lines that causes non-linear phase difference to the beam passing therethrough within one pitch. The non-linear phase difference increases the diffraction efficiency.

Further, the adjacent phase patterns are connected without phase gaps at the boundaries therebetween.

The element is generally formed by injection molding using metal mold. Since the phase patterns are connected without phase gaps, the phase patterns can be accurately transferred from the metal mold to the element.

Preferably, the substrate is formed as a meniscus cylindrical shape, and the phase patterns are formed on a concave cylindrical surface of the substrate such that the phase patterns extend along a circumference of the cylindrical surface.

The connection without phase gaps preferably requires that the grating divides the incident beam into odd numbers of the diffracted beams in order to increase the diffraction efficiency. Optionally, the diffractive grating may be designed such that the number of the diffracted beams is equal to $2^m+1$, where m is a natural number. In the field of an optical computer, $2^m$ beams are used for signal processing and the remaining single beam can be used as a monitor beam.

DESCRIPTION OF THE ACCOMPANYING DRAWINGS

FIG. 21 is a graph showing a phase pattern of the diffractive grating according to a tenth embodiment;

FIG. 22 is a graph showing a phase pattern of the diffractive grating according to a eleventh embodiment;

DESCRIPTION OF THE EMBODIMENTS

Figure 2:
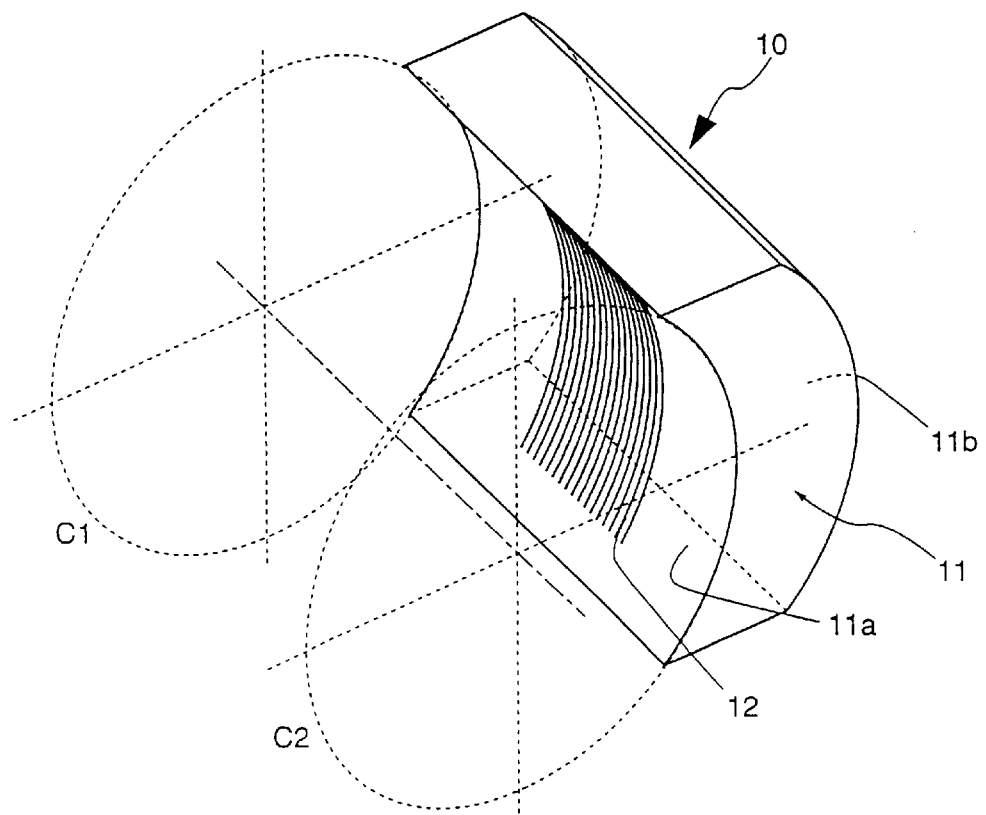
FIG. 2 is a perspective view of the beam splitter according to the invention.

FIG. 2 is a perspective view of a beam splitting element 10 according to the invention. The beam splitting element 10 includes a transparent substrate 11 made of a glass or transparent resin, and a diffractive grating 12 is formed thereon. As shown in FIG. 2, the substrate 11 is formed as a meniscus cylinder that has a concave surface 11a and a convex surface 11b. In FIG. 2, dotted lines show an imaginary cylinder. C1 and C2 denote cross sectional shape of the imaginary cylinder. As shown in FIG. 2, the cross sections C1 and C2 have the same diameter which is also a diameter of curvature of the concave surface 11a. The diffractive grating 12 is formed on the concave surface 11a.

Figure 1:
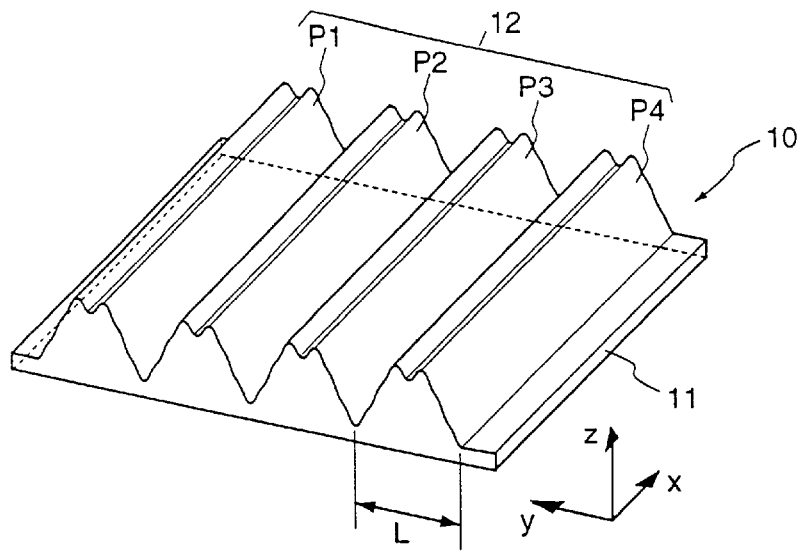
FIG. 1 is a schematic enlarged perspective view of gratings formed on a beam splitting element according to the invention.

FIG. 1 is a schematic enlarged view of the diffractive grating 12. It should be noted that in FIG. 1, the diffractive grating 12 is shown as formed on a flat surface, and description with reference to FIG. 1 is made as if the diffractive grating 12 is formed on the flat surface. As described above, however, the diffractive grating 12 is actually formed on the concave surface 11a (see FIG. 2).

In FIG. 1, x-, y- and z-axis directions are defined. The x-axis corresponds to the circumferential direction of the concave cylindrical surface 11a, and the y-axis is parallel to the generator of the cylindrical surface 11a. The z-axis is an axis perpendicular to an x-y plane.

The diffractive grating 12 is formed as a corrugated surface having a plurality of replicated phase patterns P1, P2, P3 . . . formed on the transparent substrate 11. The phase patterns are elongated in the x-axis direction and are arranged, in parallel, at a predetermined pitch in the y-axis direction. The phase pattern have a predetermined width L along the y-axis direction.

The diffractive grating 12 is designed such that the incident beam is divided into a plurality of (e.g., more than two) diffracted beams. A cross section of the phase pattern in the y-z plane has a shape that causes non-linear phase difference to the beam passes therethrough within one pitch. There are no phase gaps at the boundaries among the adjacent phase patterns. That is, one phase pattern is smoothly connected to the adjacent phase patterns. Phase difference δ at a predetermined point is defined as a difference of phases of a beam incident at the predetermined point and of a beam incident at the origin (e.g., at the lowermost portion) of the phase pattern. In the phase pattern as shown in FIG. 1, the change of the phase difference δ corresponding to the change of the incident point along the y-axis direction is represented by non-linear function.

The above construction increases the diffraction efficiency. The concrete shape of FIG. 1 corresponds to a fifth embodiment which will be described later.

It should be noted that the diffractive grating 12 can be formed on a flat surface. Practically, however, it is preferable to employ a cylindrical surface as a surface on which the diffractive grating 12 is formed.

The diffractive grating having complex phase patterns as in the embodiments described below is difficult to form using a holography process or an etching process. Accordingly, the diffractive grating is molded using a metal mold. However, if the surface on which a master pattern is to be formed is a flat surface, a cutting tool for forming the pattern is to be moved three-dimensionally, i.e., in the x, y and z axis directions relative to the surface. Considering the size of the diffractive grating, it may be very difficult to control the movement of the cutting tool three-dimensionally to form the pattern precisely.

In this embodiment, as shown in FIG. 2, the phase patterns are formed on a concave cylindrical surface of which circumferential direction is coincident with the x-axis direction. The height of each phase pattern varies only along the y-axis direction and remains constant along the x-axis direction, which facilitates control of the cutting tool.

Use of the cylindrical mold requires only two dimensional adjustment (i.e., the y-axis direction and the z-axis direction) for the cutting tool with respect to the mold. Thus, the phase patterns can be engraved accurately within a short period and at a low cost.

The mold is then used as a master to form the beam splitting element 10 through a well-known injection molding method.

Accordingly, the molded beam splitting element of the embodiment has a meniscus cylindrical shape. It should be noted that the element can be considered to have planer surfaces because the radius of curvature of the cylindrical surface is relatively large with respect to the size of the element. The phase patterns may be formed on the incident surface or on the exit surface. Whichever surface is taken, there is no difference for the diffracting function.

Figure 30:
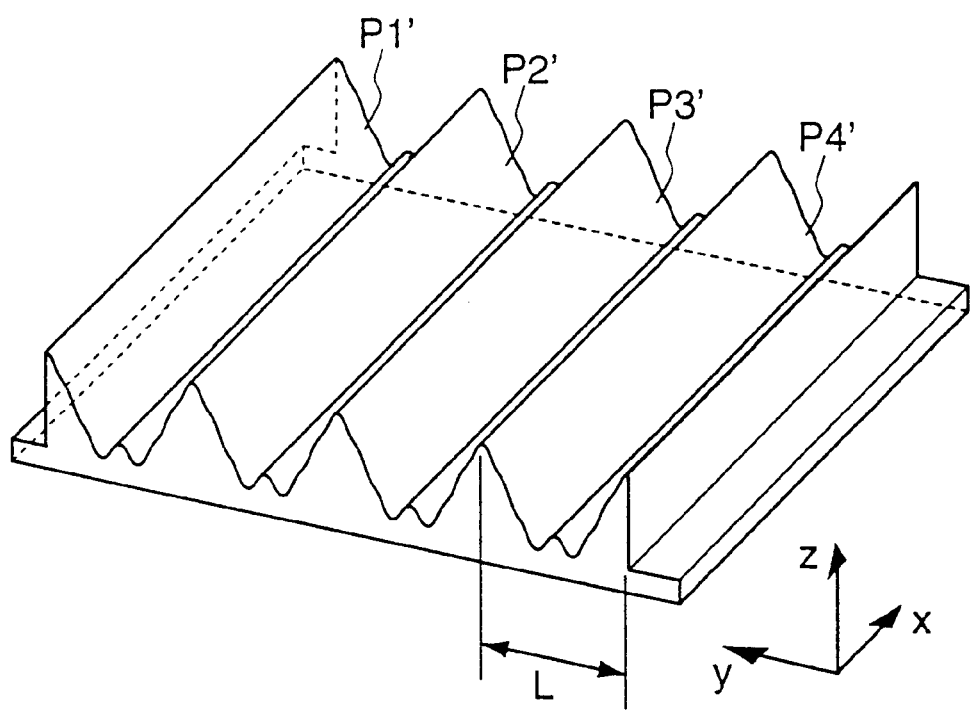
FIG. 30 is a schematic enlarged perspective view of gratings having an inverted pattern of the grating shown in FIG. 1.

Eighteen embodiments of the phase patterns are described hereinafter. In first through ninth embodiments, the beam splitting elements divide the incident beam into eight, three, five, seven, nine, eleven, thirteen, fifteen and seventeen diffractive beams, respectively. A diffractive grating has the same function even if a relief profile of a phase pattern is inverted. FIG. 30 shows a diffractive grating having the phase pattern that is the inversion of the pattern shown in FIG. 1. The tenth through eighteenth embodiments are provided with the phase patterns which are inversion of the patterns of the first through ninth embodiments, respectively.

The phase pattern is designed for splitting a single beam into the intended number of beams with optimizing to satisfy conditions: (1) intensities of all exit beams are substantially the same; and (2) the incident beam is divided into only the intended number of beams.

First Embodiment

TABLE 1 shows data for the phase pattern of the grating formed on the beam splitting element according to the first embodiment for dividing an incident beam into eight beams. In TABLE 1, "Coord." (designated 0–63) represents the position in the y-axis direction when the pitch width L of the phase pattern is divided into 64 coordinates, and "δ" represents the phase difference at the corresponding coordinate with respect to the phase at the origin (Coord.=0). The phase difference δ is given in radians. Accordingly, a height H along the z-axis direction (i.e., an actual height of the phase pattern) in micrometers (μm) may be calculated, for a predetermined incident beam, using the formula:

$$H = \delta \times \lambda / (2\pi(n-1)),$$

where n is a refractive index of the material of the beam splitting element and λ is a wavelength of the incident beam. It is assumed that the beam splitting element is located within the air whose refractive index is regarded as 1.

Figure 3:
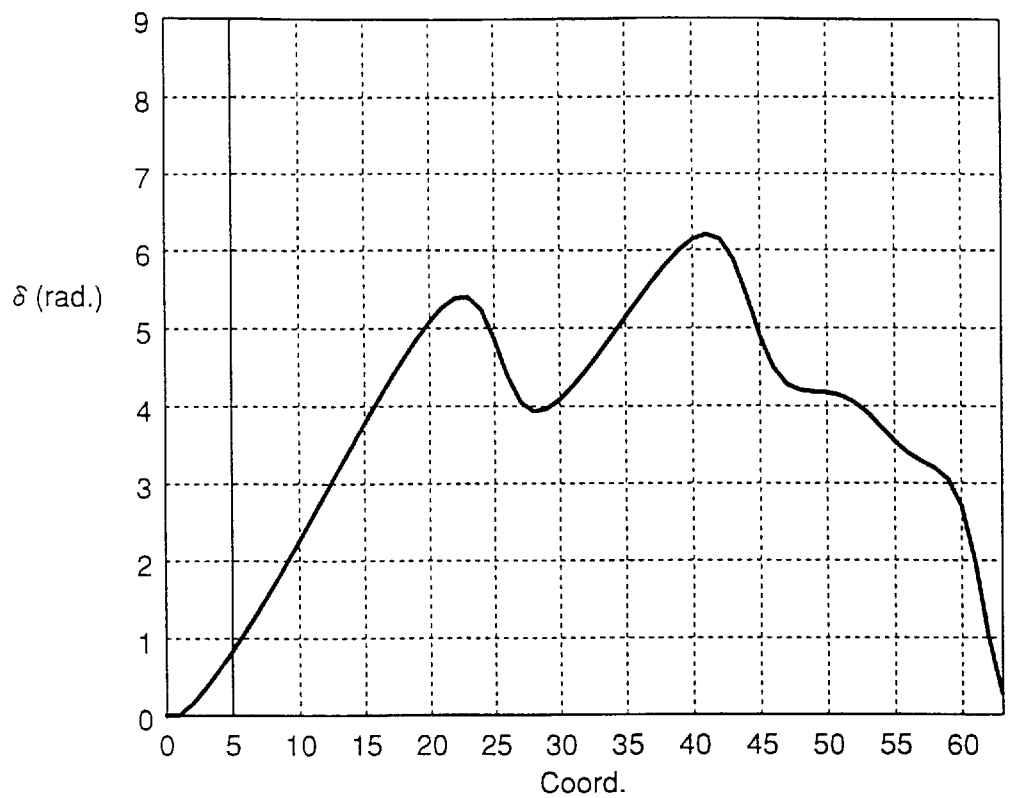
FIG. 3 is a graph showing a phase pattern of the diffractive grating according to a first embodiment.

A graphical representation of the data is shown in FIG. 3 where a vertical axis is the phase difference δ, and a horizontal axis is the coordinate along the y-axis direction.

TABLE 1

| Coord. | δ | Coord. | δ | Coord. | δ |
|---|---|---|---|---|---|
| 0 | 0.00000 | 22 | 5.38745 | 43 | 5.88525 |
| 1 | 0.00584 | 23 | 5.39829 | 44 | 5.41667 |
| 2 | 0.15164 | 24 | 5.23065 | 45 | 4.88464 |
| 3 | 0.35629 | 25 | 4.85749 | 46 | 4.48907 |
| 4 | 0.58665 | 26 | 4.39754 | 47 | 4.28159 |
| 5 | 0.83274 | 27 | 4.06325 | 48 | 4.20466 |
| 6 | 1.09396 | 28 | 3.93283 | 49 | 4.18625 |
| 7 | 1.37055 | 29 | 3.96292 | 50 | 4.17531 |
| 8 | 1.65867 | 30 | 4.08551 | 51 | 4.13989 |
| 9 | 1.95725 | 31 | 4.25798 | 52 | 4.05584 |
| 10 | 2.26136 | 32 | 4.46010 | 53 | 3.91493 |
| 11 | 2.56901 | 33 | 4.67944 | 54 | 3.73275 |
| 12 | 2.87576 | 34 | 4.91025 | 55 | 3.54727 |
| 13 | 3.17996 | 35 | 5.14559 | 56 | 3.39464 |
| 14 | 3.48272 | 36 | 5.37916 | 57 | 3.28598 |
| 15 | 3.77944 | 37 | 5.60412 | 58 | 3.19644 |
| 16 | 4.06951 | 38 | 5.81229 | 59 | 3.04634 |
| 17 | 4.34806 | 39 | 5.99531 | 60 | 2.70057 |
| 18 | 4.61248 | 40 | 6.13707 | 61 | 1.99407 |
| 19 | 4.85863 | 41 | 6.20469 | 62 | 1.00901 |
| 20 | 5.08064 | 42 | 6.14380 | 63 | 0.28129 |
| 21 | 5.26485 | | | | |

Figure 4:
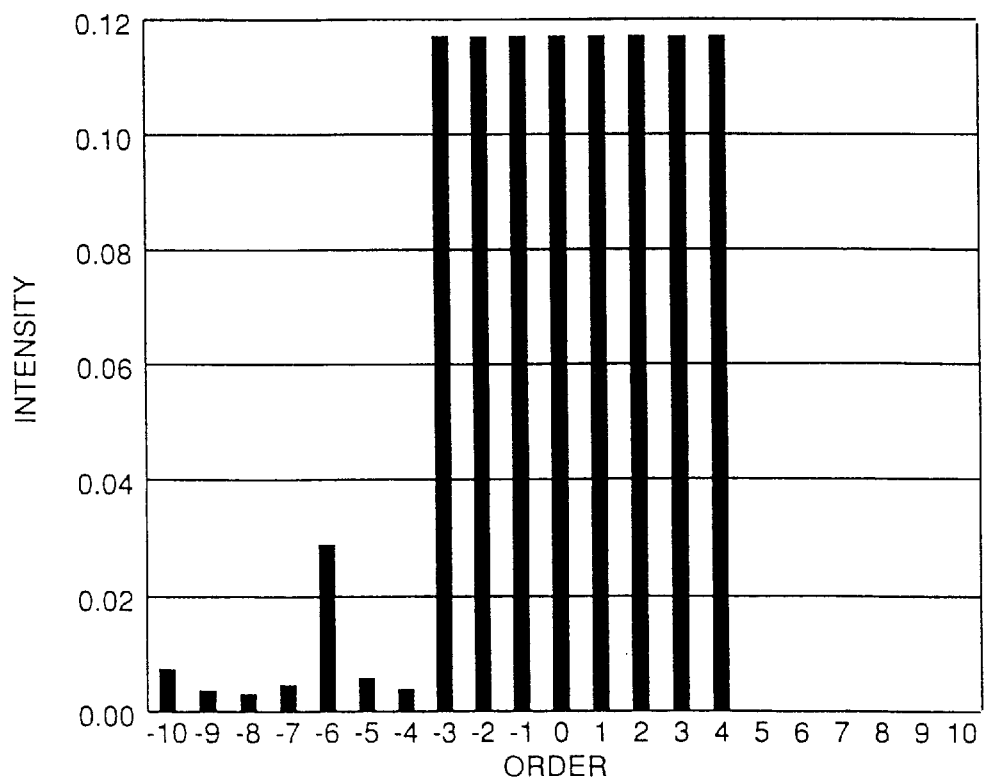
FIG. 4 is a graph showing a distribution of intensities of the divided beams according to the diffractive grating having the phase pattern shown in FIG. 3.

TABLE 2 shows the intensity of each exit beams from the beam splitting element as a relative intensity when the intensity of the incident beam is defined as 1. FIG. 4 is a graphical representation of TABLE 2. In FIG. 4, the horizontal axis represents the order of the diffracted beam and the vertical axis represents the intensity of each order.

TABLE 2

| Order | Intensity | Order | Intensity |
|---|---|---|---|
| −10 | 0.00743 | 1 | 0.11703 |
| −9 | 0.00368 | 2 | 0.11703 |
| −8 | 0.00304 | 3 | 0.11701 |
| −7 | 0.00472 | 4 | 0.11704 |
| −6 | 0.02884 | 5 | 0.00001 |
| −5 | 0.00592 | 6 | 0.00001 |
| −4 | 0.00393 | 7 | 0.00003 |
| −3 | 0.11705 | 8 | 0.00000 |
| −2 | 0.11701 | 9 | 0.00002 |
| −1 | 0.11704 | 10 | 0.00001 |
| 0 | 0.11704 | Diffraction Efficiency 93.63% | |

Second Embodiment

Figure 5:
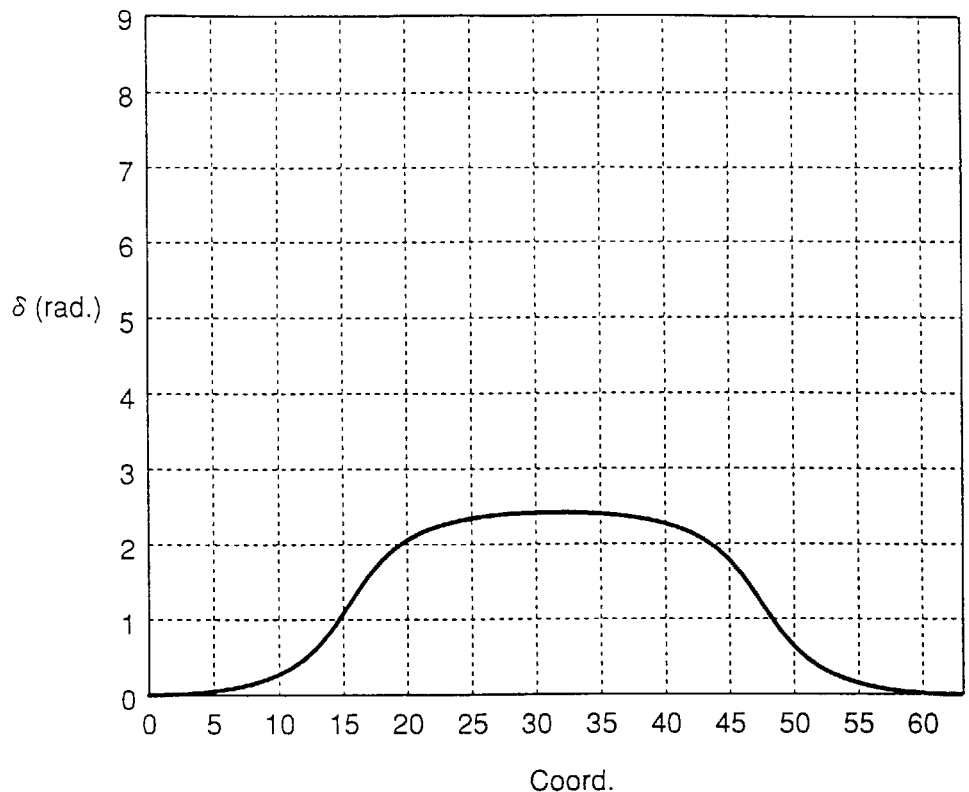
FIG. 5 is a graph showing a phase pattern of the diffractive grating according to a second embodiment.
Figure 6:
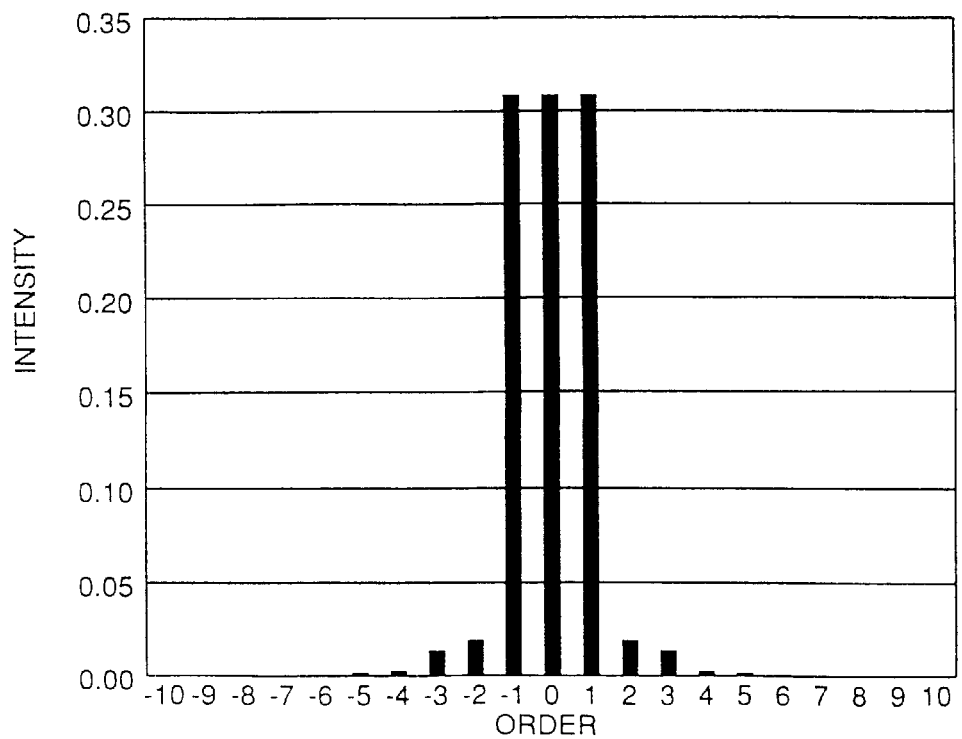
FIG. 6 is a graph showing a distribution of intensities of the divided beams according to the diffractive grating having the phase pattern shown in FIG. 5.

TABLE 3 shows data for the phase pattern of the second embodiment for dividing an incident beam into three beams, and the data is shown graphically in FIG. 5. The intensity distribution of the second embodiment is shown in TABLE 4 and a graph in FIG. 6.

TABLE 3

| Coord. | δ | Coord. | δ | Coord. | δ |
|---|---|---|---|---|---|
| 0 | 0.00000 | 22 | 2.21711 | 43 | 2.05870 |
| 1 | 0.00266 | 23 | 2.26976 | 44 | 1.94086 |
| 2 | 0.00934 | 24 | 2.31073 | 45 | 1.78317 |
| 3 | 0.01902 | 25 | 2.34250 | 46 | 1.58197 |
| 4 | 0.03379 | 26 | 2.36768 | 47 | 1.33965 |
| 5 | 0.05260 | 27 | 2.38649 | 48 | 1.08013 |
| 6 | 0.07728 | 28 | 2.40075 | 49 | 0.83831 |
| 7 | 0.10905 | 29 | 2.41043 | 50 | 0.63661 |
| 8 | 0.15001 | 30 | 2.41712 | 51 | 0.48041 |
| 9 | 0.20267 | 31 | 2.42003 | 52 | 0.36058 |

TABLE 3-continued

| Coord. | δ | Coord. | δ | Coord. | δ |
|---|---|---|---|---|---|
| 10 | 0.27091 | 32 | 2.42003 | 53 | 0.27091 |
| 11 | 0.36058 | 33 | 2.41712 | 54 | 0.20267 |
| 12 | 0.48041 | 34 | 2.41043 | 55 | 0.15001 |
| 13 | 0.63661 | 35 | 2.40075 | 56 | 0.10905 |
| 14 | 0.83831 | 36 | 2.38649 | 57 | 0.07728 |
| 15 | 1.08013 | 37 | 2.36768 | 58 | 0.05260 |
| 16 | 1.33965 | 38 | 2.34250 | 59 | 0.03379 |
| 17 | 1.58197 | 39 | 2.31073 | 60 | 0.01902 |
| 18 | 1.78317 | 40 | 2.26976 | 61 | 0.00934 |
| 19 | 1.94086 | 41 | 2.21711 | 62 | 0.00266 |
| 20 | 2.05870 | 42 | 2.14936 | 63 | 0.00000 |
| 21 | 2.14936 | | | | |

TABLE 4

| Order | Intensity | Order | Intensity |
|---|---|---|---|
| −10 | 0.00001 | 1 | 0.30852 |
| −9 | 0.00004 | 2 | 0.01886 |
| −8 | 0.00007 | 3 | 0.01351 |
| −7 | 0.00024 | 4 | 0.00249 |
| −6 | 0.00040 | 5 | 0.00157 |
| −5 | 0.00157 | 6 | 0.00040 |
| −4 | 0.00249 | 7 | 0.00024 |
| −3 | 0.01351 | 8 | 0.00007 |
| −2 | 0.01886 | 9 | 0.00004 |
| −1 | 0.30852 | 10 | 0.00001 |
| 0 | 0.30851 | Diffraction Efficiency 92.56% | |

Third Embodiment

Figure 7:
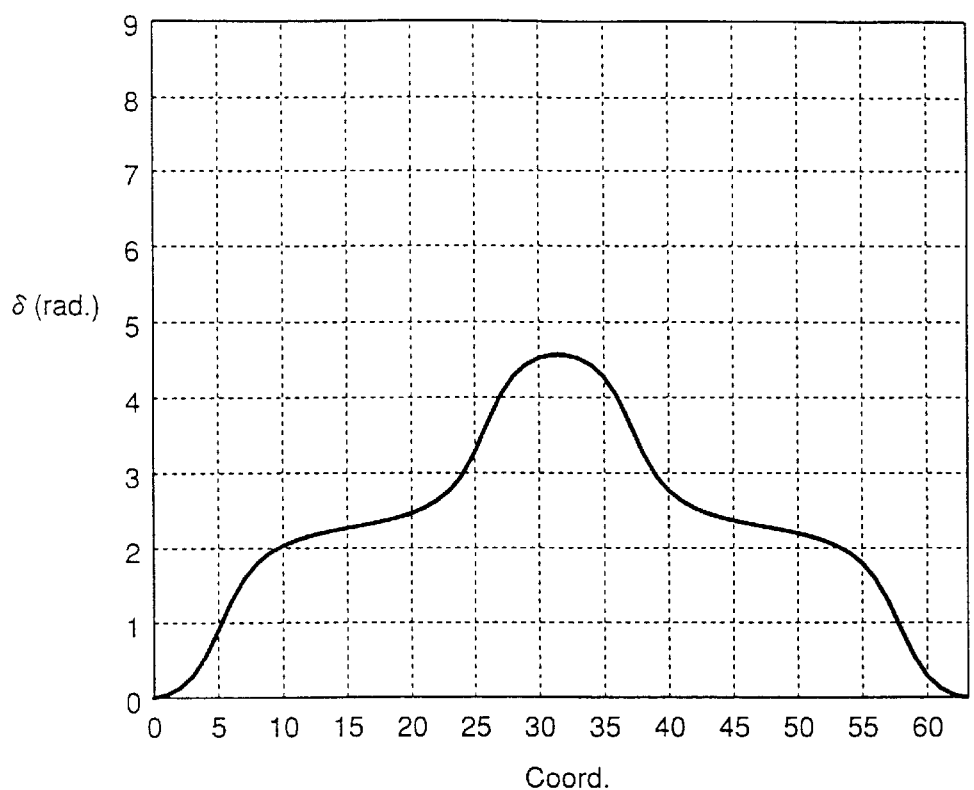
FIG. 7 is a graph showing a phase pattern of the diffractive grating according to a third embodiment.
Figure 8:
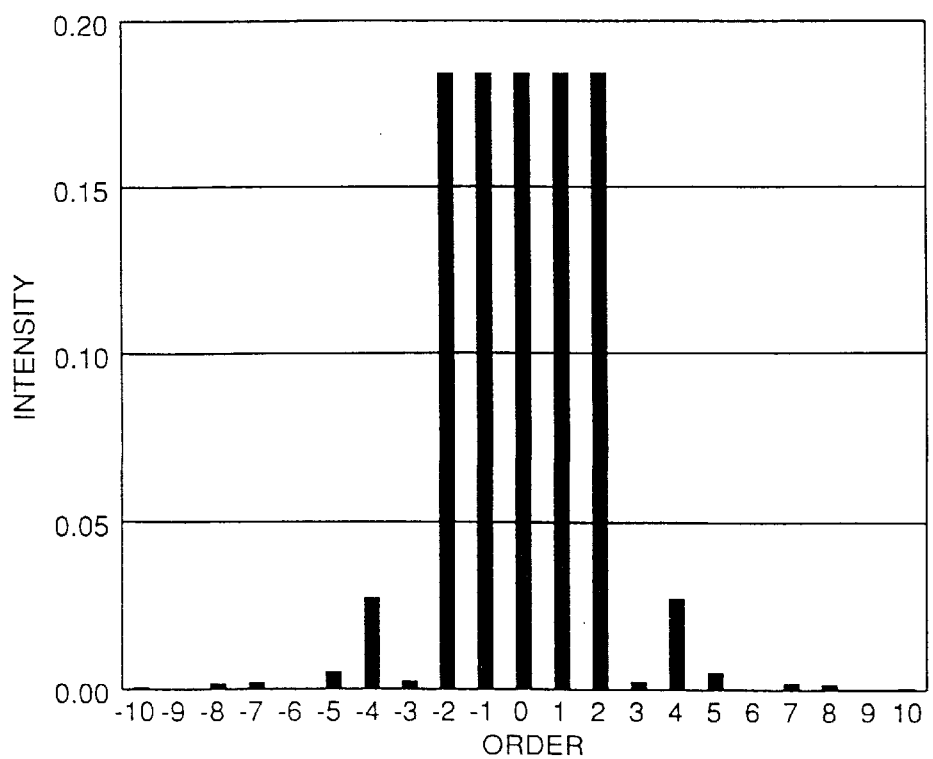
FIG. 8 is a graph showing a distribution of intensities of the divided beams according to the diffractive grating having the phase pattern shown in FIG. 7.

TABLE 5 shows data for the phase pattern of the third embodiment for dividing an incident beam into five beams, and the data is shown graphically in FIG. 7. The intensity distribution of the third embodiment is shown in TABLE 6 and a graph in FIG. 8.

TABLE 5

| Coord. | δ | Coord. | δ | Coord. | δ |
|---|---|---|---|---|---|
| 0 | 0.00000 | 22 | 2.62592 | 43 | 2.46280 |
| 1 | 0.03924 | 23 | 2.76440 | 44 | 2.41055 |
| 2 | 0.12827 | 24 | 2.97184 | 45 | 2.36750 |
| 3 | 0.28679 | 25 | 3.27700 | 46 | 2.33120 |
| 4 | 0.54293 | 26 | 3.66127 | 47 | 2.29773 |
| 5 | 0.90164 | 27 | 4.02048 | 48 | 2.26544 |
| 6 | 1.28567 | 28 | 4.27638 | 49 | 2.23221 |
| 7 | 1.59133 | 29 | 4.43440 | 50 | 2.19516 |
| 8 | 1.79877 | 30 | 4.52392 | 51 | 2.15337 |
| 9 | 1.93725 | 31 | 4.56329 | 52 | 2.10062 |
| 10 | 2.03162 | 32 | 4.56329 | 53 | 2.03162 |
| 11 | 2.10062 | 33 | 4.52392 | 54 | 1.93725 |
| 12 | 2.15337 | 34 | 4.43440 | 55 | 1.79877 |
| 13 | 2.19516 | 35 | 4.27638 | 56 | 1.59133 |
| 14 | 2.23221 | 36 | 4.02048 | 57 | 1.28567 |
| 15 | 2.26544 | 37 | 3.66127 | 58 | 0.90164 |
| 16 | 2.29773 | 38 | 3.27700 | 59 | 0.54293 |
| 17 | 2.33120 | 39 | 2.97184 | 60 | 0.28679 |
| 18 | 2.36750 | 40 | 2.76440 | 61 | 0.12827 |
| 19 | 2.41055 | 41 | 2.62592 | 62 | 0.03924 |
| 20 | 2.46280 | 42 | 2.53130 | 63 | 0.00000 |
| 21 | 2.53130 | | | | |

TABLE 6

| Order | Intensity | Order | Intensity |
|---|---|---|---|
| −10 | 0.00038 | 1 | 0.18425 |
| −9 | 0.00000 | 2 | 0.18424 |

TABLE 6-continued

| Order | Intensity | Order | Intensity |
|---|---|---|---|
| −8 | 0.00170 | 3 | 0.00232 |
| −7 | 0.00203 | 4 | 0.02739 |
| −6 | 0.00000 | 5 | 0.00522 |
| −5 | 0.00522 | 6 | 0.00000 |
| −4 | 0.02739 | 7 | 0.00203 |
| −3 | 0.00232 | 8 | 0.00170 |
| −2 | 0.18424 | 9 | 0.00000 |
| −1 | 0.18425 | 10 | 0.00038 |
| 0 | 0.18425 | Diffraction Efficiency 92.13% | |

Fourth Embodiment

Figure 9:
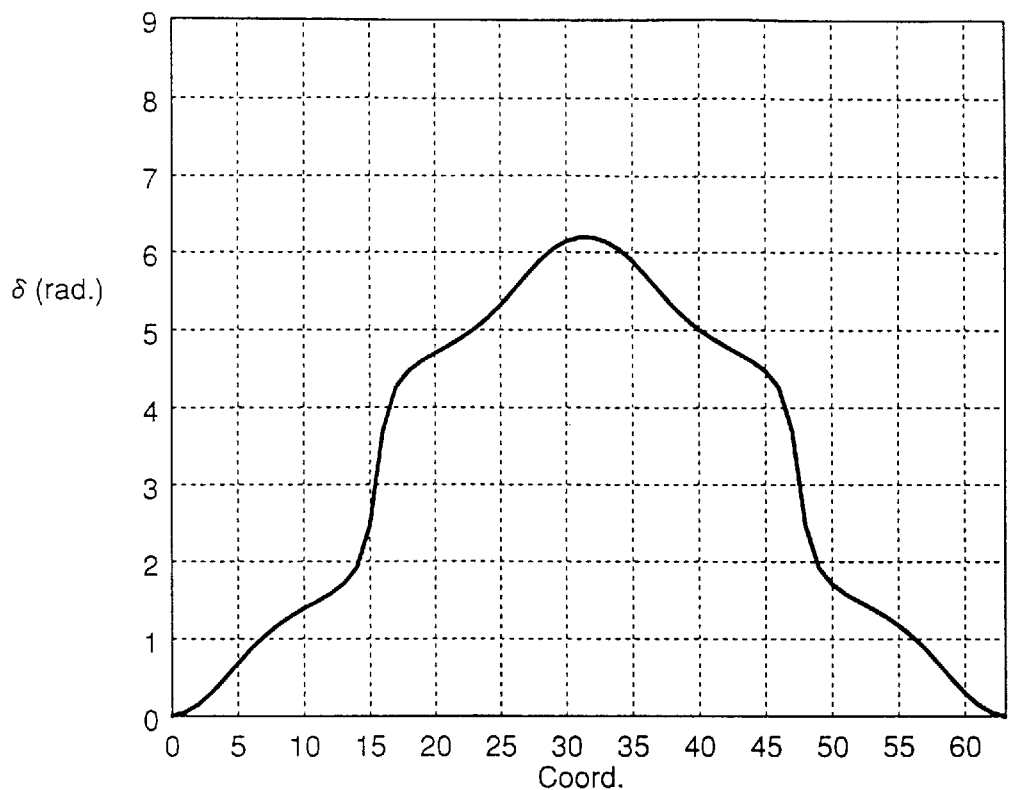
FIG. 9 is a graph showing a phase pattern of the diffractive grating according to a fourth embodiment.
Figure 10:
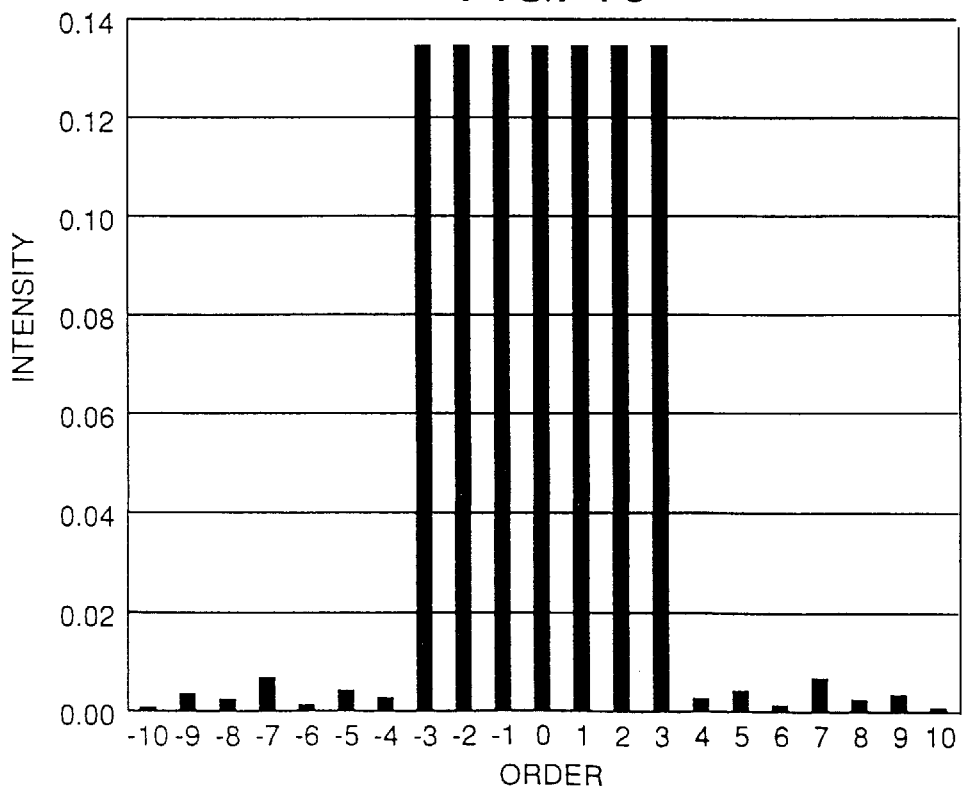
FIG. 10 is a graph showing a distribution of intensities of the divided beams according to the diffractive grating having the phase pattern shown in FIG. 9.

TABLE 7 shows data for the phase pattern of the fourth embodiment for dividing an incident beam into seven beams, and the data is shown graphically in FIG. 9. The intensity distribution of the fourth embodiment is shown in TABLE 8 and a graph in FIG. 10.

TABLE 7

| Coord. | δ | Coord. | δ | Coord. | δ |
|---|---|---|---|---|---|
| 0 | 0.00000 | 22 | 4.89469 | 43 | 4.69983 |
| 1 | 0.05027 | 23 | 5.01011 | 44 | 4.60144 |
| 2 | 0.15007 | 24 | 5.14838 | 45 | 4.47545 |
| 3 | 0.29821 | 25 | 5.31383 | 46 | 4.26462 |
| 4 | 0.48248 | 26 | 5.50347 | 47 | 3.70625 |
| 5 | 0.68149 | 27 | 5.70248 | 48 | 2.47821 |
| 6 | 0.87213 | 28 | 5.88726 | 49 | 1.92085 |
| 7 | 1.03758 | 29 | 6.03539 | 50 | 1.71051 |
| 8 | 1.17586 | 30 | 6.13519 | 51 | 1.58452 |
| 9 | 1.29178 | 31 | 6.18521 | 52 | 1.48613 |
| 10 | 1.39202 | 32 | 6.18521 | 53 | 1.39202 |
| 11 | 1.48613 | 33 | 6.13519 | 54 | 1.29178 |
| 12 | 1.58452 | 34 | 6.03539 | 55 | 1.17586 |
| 13 | 1.71051 | 35 | 5.88726 | 56 | 1.03758 |
| 14 | 1.92085 | 36 | 5.70248 | 57 | 0.87213 |
| 15 | 2.47821 | 37 | 5.50347 | 58 | 0.68149 |
| 16 | 3.70625 | 38 | 5.31383 | 59 | 0.48248 |
| 17 | 4.26462 | 39 | 5.14838 | 60 | 0.29821 |
| 18 | 4.47545 | 40 | 5.01011 | 61 | 0.15007 |
| 19 | 4.60144 | 41 | 4.89469 | 62 | 0.05027 |
| 20 | 4.69983 | 42 | 4.79444 | 63 | 0.00000 |
| 21 | 4.79444 | | | | |

TABLE 8

| Order | Intensity | Order | Intensity |
|---|---|---|---|
| −10 | 0.00083 | 1 | 0.13466 |
| −9 | 0.00358 | 2 | 0.13467 |
| −8 | 0.00260 | 3 | 0.13468 |
| −7 | 0.00693 | 4 | 0.00282 |
| −6 | 0.00136 | 5 | 0.00426 |
| −5 | 0.00426 | 6 | 0.00136 |
| −4 | 0.00282 | 7 | 0.00693 |
| −3 | 0.13468 | 8 | 0.00260 |
| −2 | 0.13467 | 9 | 0.00358 |
| −1 | 0.13466 | 10 | 0.00083 |
| 0 | 0.13466 | Diffraction Efficiency 94.27% | |

Fifth Embodiment

Figure 11:
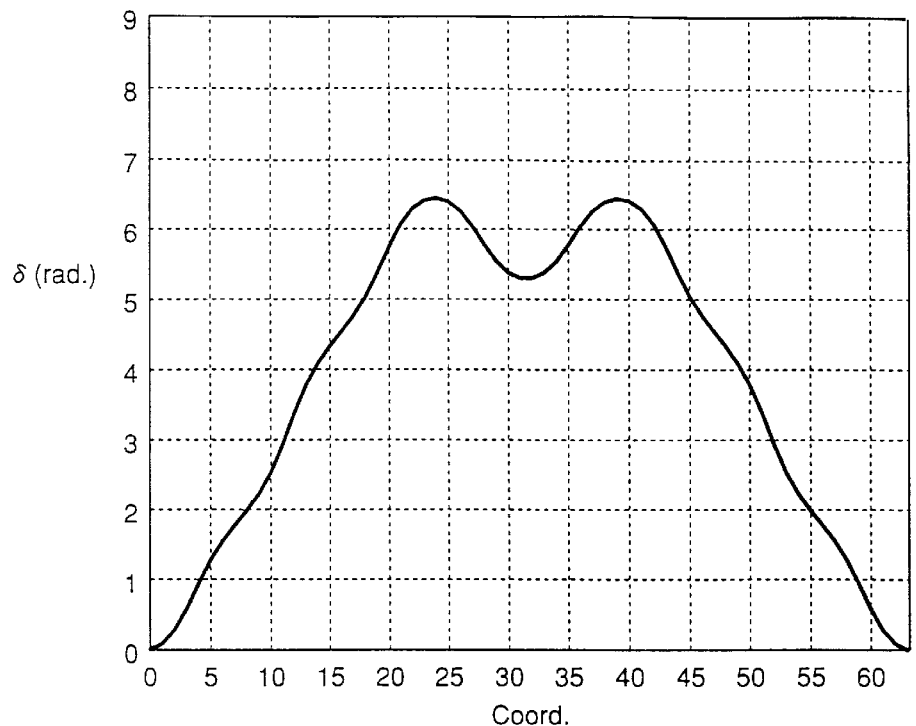
FIG. 11 is a graph showing a phase pattern of the diffractive grating according to a fifth embodiment.
Figure 12:
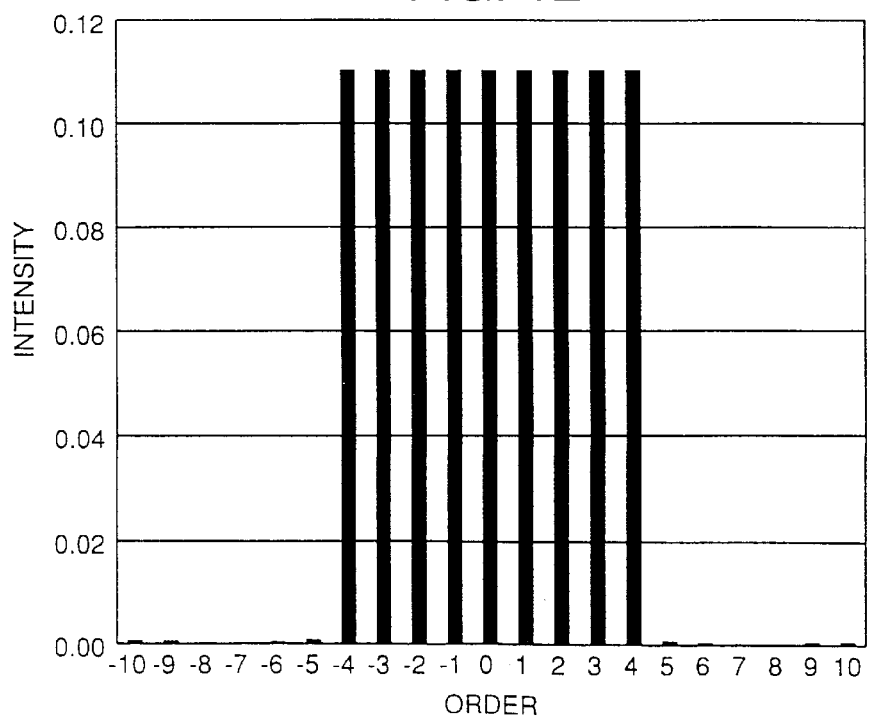
FIG. 12 is a graph showing a distribution of intensities of the divided beams according to the diffractive grating having the phase pattern shown in FIG. 11.

TABLE 9 shows data for the phase pattern of the fifth embodiment for dividing an incident beam into nine beams, and the data is shown graphically in FIG. 11. The intensity distribution of the fifth embodiment is shown in TABLE 10 and a graph in FIG. 12.

TABLE 9

| Coord. | δ | Coord. | δ | Coord. | δ |
|---|---|---|---|---|---|
| 0 | 0.00000 | 22 | 6.29969 | 43 | 5.74883 |
| 1 | 0.08727 | 23 | 6.42061 | 44 | 5.37594 |
| 2 | 0.28157 | 24 | 6.45338 | 45 | 5.03895 |
| 3 | 0.58121 | 25 | 6.40383 | 46 | 4.77212 |
| 4 | 0.94548 | 26 | 6.26897 | 47 | 4.54875 |
| 5 | 1.28199 | 27 | 6.04448 | 48 | 4.33621 |
| 6 | 1.55363 | 28 | 5.77626 | 49 | 4.09535 |
| 7 | 1.77708 | 29 | 5.53539 | 50 | 3.78851 |
| 8 | 1.98986 | 30 | 5.37669 | 51 | 3.38602 |
| 9 | 2.22728 | 31 | 5.29971 | 52 | 2.93113 |
| 10 | 2.53102 | 32 | 5.29971 | 53 | 2.53102 |
| 11 | 2.93113 | 33 | 5.37669 | 54 | 2.22728 |
| 12 | 3.38602 | 34 | 5.53539 | 55 | 1.98986 |
| 13 | 3.78851 | 35 | 5.77626 | 56 | 1.77708 |
| 14 | 4.09535 | 36 | 6.04448 | 57 | 1.55363 |
| 15 | 4.33621 | 37 | 6.26897 | 58 | 1.28199 |
| 16 | 4.54875 | 38 | 6.40383 | 59 | 0.94548 |
| 17 | 4.77212 | 39 | 6.45338 | 60 | 0.58121 |
| 18 | 5.03895 | 40 | 6.42061 | 61 | 0.28157 |
| 19 | 5.37594 | 41 | 6.29969 | 62 | 0.08727 |
| 20 | 5.74883 | 42 | 6.07744 | 63 | 0.00000 |
| 21 | 6.07744 | | | | |

TABLE 10

| Order | Intensity | Order | Intensity |
|---|---|---|---|
| −10 | 0.00059 | 1 | 0.11031 |
| −9 | 0.00054 | 2 | 0.11031 |
| −8 | 0.00021 | 3 | 0.11031 |
| −7 | 0.00021 | 4 | 0.11031 |
| −6 | 0.00036 | 5 | 0.00076 |
| −5 | 0.00076 | 6 | 0.00036 |
| −4 | 0.11031 | 7 | 0.00021 |
| −3 | 0.11031 | 8 | 0.00021 |
| −2 | 0.11031 | 9 | 0.00054 |
| −1 | 0.11031 | 10 | 0.00059 |
| 0 | 0.11031 | Diffraction Efficiency 99.28% | |

Sixth Embodiment

Figure 13:
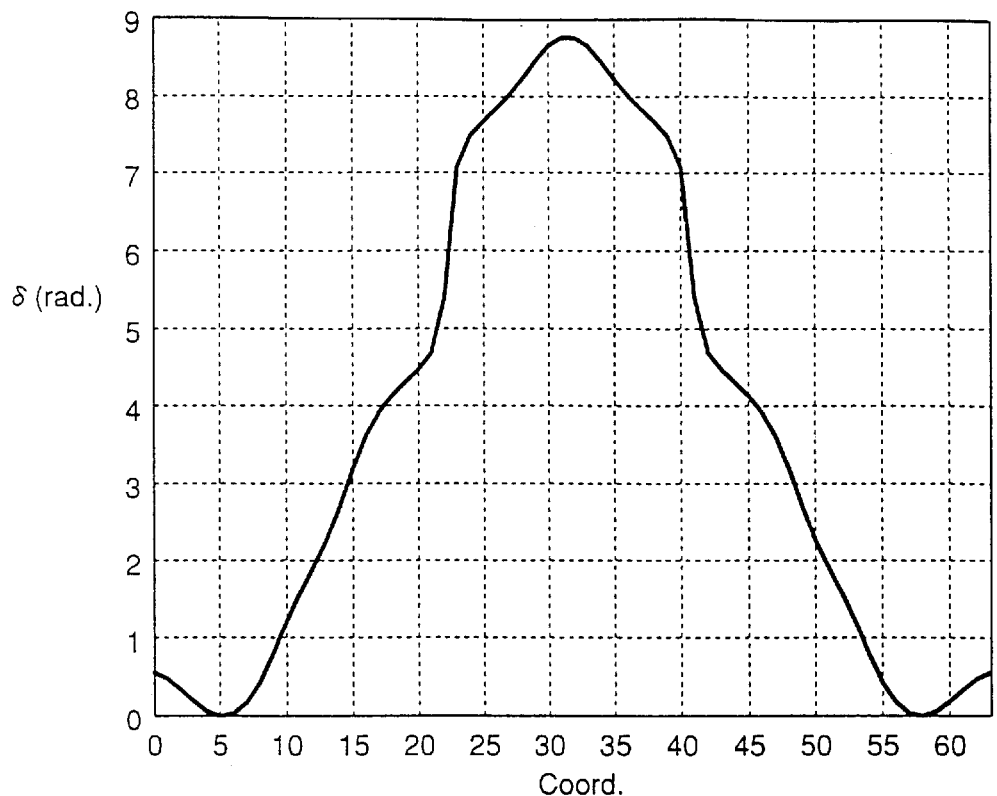
FIG. 13 is a graph showing a phase pattern of the diffractive grating according to a sixth embodiment.
Figure 14:
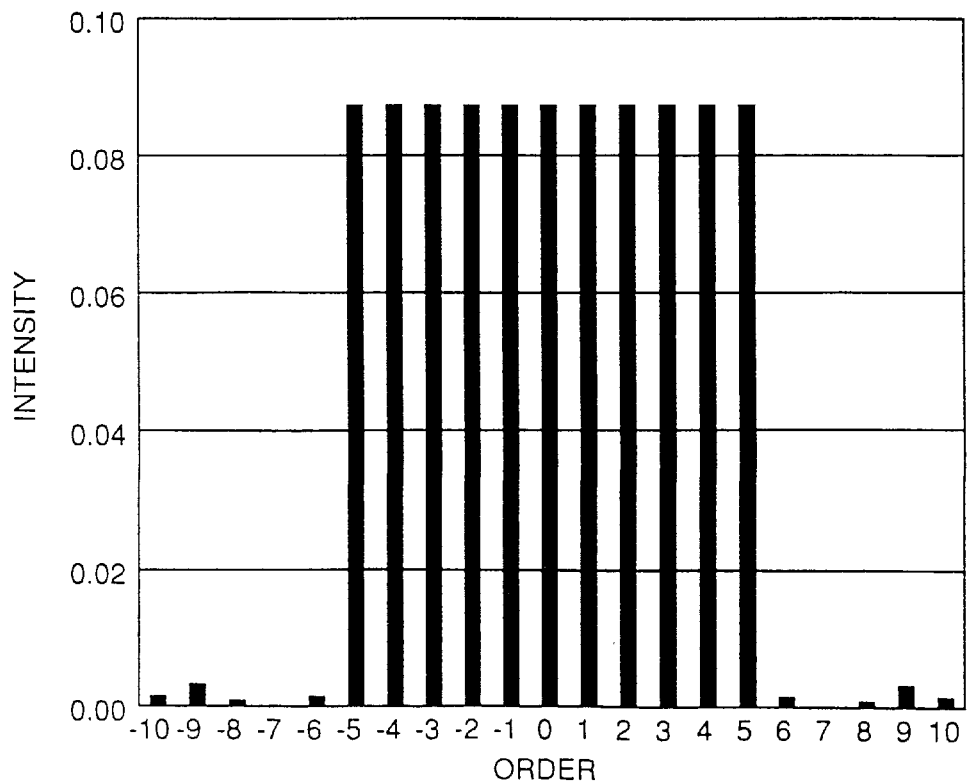
FIG. 14 is a graph showing a distribution of intensities of the divided beams according to the diffractive grating having the phase pattern shown in FIG. 13.

TABLE 11 shows data for the phase pattern of the sixth embodiment for dividing an incident beam into eleven beams, and the data is shown graphically in FIG. 13. The intensity distribution of the sixth embodiment is shown in TABLE 12 and a graph in FIG. 14.

TABLE 11

| Coord. | δ | Coord. | δ | Coord. | δ |
|---|---|---|---|---|---|
| 0 | 0.55035 | 22 | 5.40090 | 43 | 4.46845 |
| 1 | 0.47385 | 23 | 7.07890 | 44 | 4.30615 |
| 2 | 0.33730 | 24 | 7.48005 | 45 | 4.13665 |
| 3 | 0.18130 | 25 | 7.67005 | 46 | 3.91935 |
| 4 | 0.05650 | 26 | 7.83650 | 47 | 3.61435 |
| 5 | 0.00000 | 27 | 8.01900 | 48 | 3.19015 |
| 6 | 0.02905 | 28 | 8.23470 | 49 | 2.70165 |
| 7 | 0.16455 | 29 | 8.46370 | 50 | 2.26785 |
| 8 | 0.42500 | 30 | 8.66000 | 51 | 1.91135 |
| 9 | 0.80350 | 31 | 8.76950 | 52 | 1.57925 |
| 10 | 1.21375 | 32 | 8.76950 | 53 | 1.21375 |
| 11 | 1.57925 | 33 | 8.66000 | 54 | 0.80350 |
| 12 | 1.91135 | 34 | 8.46370 | 55 | 0.42500 |
| 13 | 2.26785 | 35 | 8.23470 | 56 | 0.16455 |
| 14 | 2.70165 | 36 | 8.01900 | 57 | 0.02905 |
| 15 | 3.19015 | 37 | 7.83650 | 58 | 0.00000 |
| 16 | 3.61435 | 38 | 7.67005 | 59 | 0.05650 |
| 17 | 3.91935 | 39 | 7.48005 | 60 | 0.18130 |
| 18 | 4.13665 | 40 | 7.07890 | 61 | 0.33730 |

TABLE 11-continued

| Coord. | δ | Coord. | δ | Coord. | δ |
|---|---|---|---|---|---|
| 19 | 4.30615 | 41 | 5.40090 | 62 | 0.47385 |
| 20 | 4.46845 | 42 | 4.69145 | 63 | 0.55035 |
| 21 | 4.69145 | | | | |

TABLE 12

| Order | Intensity | Order | Intensity |
|---|---|---|---|
| −10 | 0.00156 | 1 | 0.08737 |
| −9 | 0.00329 | 2 | 0.08737 |
| −8 | 0.00092 | 3 | 0.08736 |
| −7 | 0.00012 | 4 | 0.08736 |
| −6 | 0.00157 | 5 | 0.08738 |
| −5 | 0.08738 | 6 | 0.00157 |
| −4 | 0.08736 | 7 | 0.00012 |
| −3 | 0.08736 | 8 | 0.00092 |
| −2 | 0.08737 | 9 | 0.00329 |
| −1 | 0.08737 | 10 | 0.00156 |
| 0 | 0.08737 | Diffraction Efficiency 96.10% | |

Seventh Embodiment

Figure 15:
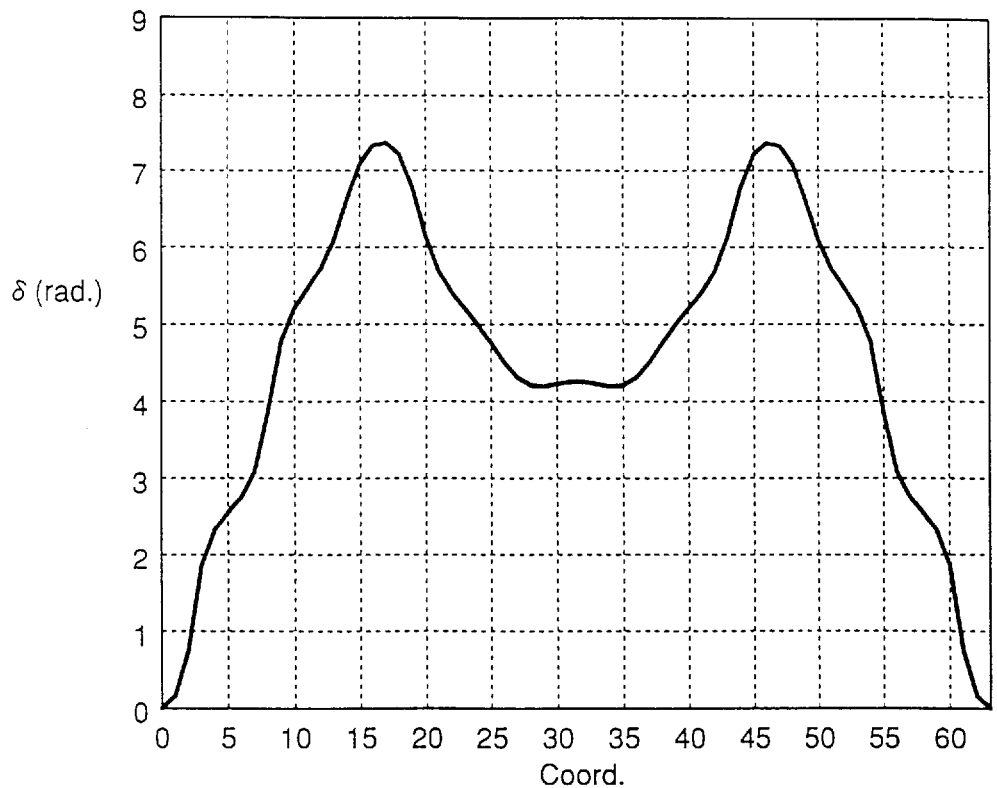
FIG. 15 is a graph showing a phase pattern of the diffractive grating according to a seventh embodiment.
Figure 16:
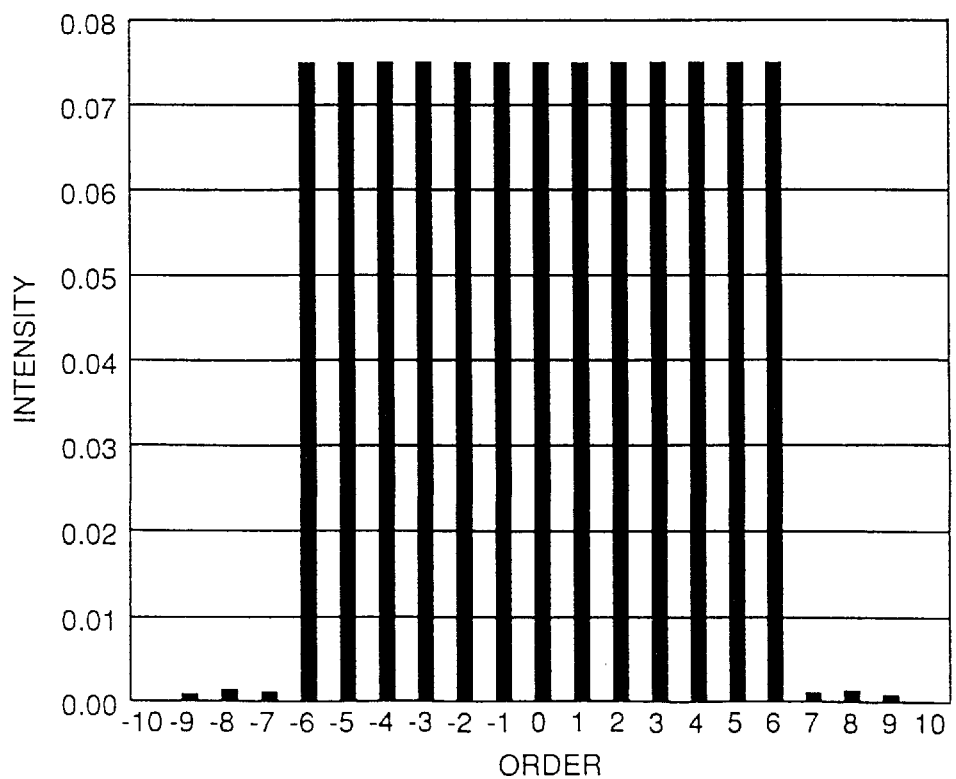
FIG. 16 is a graph showing a distribution of intensities of the divided beams according to the diffractive grating having the phase pattern shown in FIG. 15.

TABLE 13 shows data for the phase pattern of the seventh embodiment for dividing an incident beam into thirteen beams, and the data is shown graphically in FIG. 15. The intensity distribution of the seventh embodiment is shown in TABLE 14 and a graph in FIG. 16.

TABLE 13

| Coord. | δ | Coord. | δ | Coord. | δ |
|---|---|---|---|---|---|
| 0 | 0.00000 | 22 | 5.41622 | 43 | 6.13950 |
| 1 | 0.15833 | 23 | 5.21037 | 44 | 6.77070 |
| 2 | 0.75073 | 24 | 5.00017 | 45 | 7.20190 |
| 3 | 1.86137 | 25 | 4.76167 | 46 | 7.35715 |
| 4 | 2.33517 | 26 | 4.51136 | 47 | 7.31860 |
| 5 | 2.55480 | 27 | 4.31334 | 48 | 7.08340 |
| 6 | 2.75605 | 28 | 4.21224 | 49 | 6.61767 |
| 7 | 3.08432 | 29 | 4.19796 | 50 | 6.09398 |
| 8 | 3.86142 | 30 | 4.22956 | 51 | 5.72612 |
| 9 | 4.78773 | 31 | 4.25834 | 52 | 5.47112 |
| 10 | 5.21682 | 32 | 4.25834 | 53 | 5.21682 |
| 11 | 5.47112 | 33 | 4.22956 | 54 | 4.78773 |
| 12 | 5.72612 | 34 | 4.19796 | 55 | 3.86142 |
| 13 | 6.09398 | 35 | 4.21224 | 56 | 3.08432 |
| 14 | 6.61767 | 36 | 4.31334 | 57 | 2.75605 |
| 15 | 7.08340 | 37 | 4.51136 | 58 | 2.55480 |
| 16 | 7.31860 | 38 | 4.76167 | 59 | 2.33517 |
| 17 | 7.35715 | 39 | 5.00017 | 60 | 1.86137 |
| 18 | 7.20190 | 40 | 5.21037 | 61 | 0.75073 |
| 19 | 6.77070 | 41 | 5.41622 | 62 | 0.15833 |
| 20 | 6.13950 | 42 | 5.68672 | 63 | 0.00000 |
| 21 | 5.68672 | | | | |

TABLE 14

| Order | Intensity | Order | Intensity |
|---|---|---|---|
| −10 | 0.00008 | 1 | 0.07502 |
| −9 | 0.00085 | 2 | 0.07503 |
| −8 | 0.00138 | 3 | 0.07503 |
| −7 | 0.00113 | 4 | 0.07503 |
| −6 | 0.07502 | 5 | 0.07502 |
| −5 | 0.07502 | 6 | 0.07502 |
| −4 | 0.07503 | 7 | 0.00113 |
| −3 | 0.07503 | 8 | 0.00138 |
| −2 | 0.07503 | 9 | 0.00085 |
| −1 | 0.07502 | 10 | 0.00008 |
| 0 | 0.07502 | Diffraction Efficiency 97.54% | |

Eighth Embodiment

Figure 17:
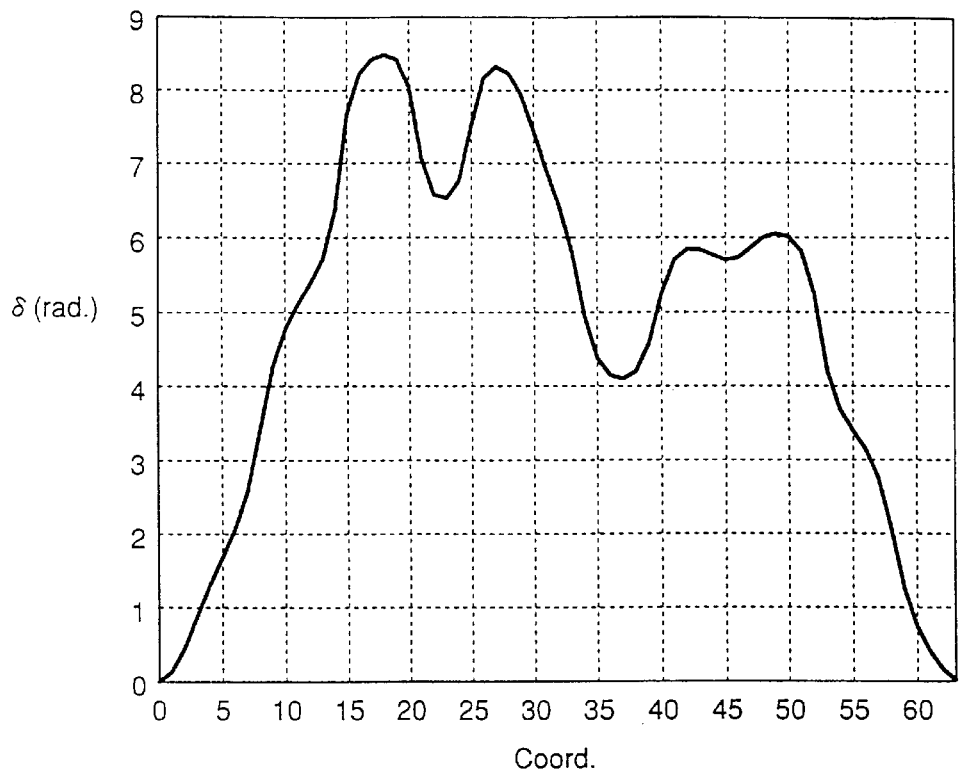
FIG. 17 is a graph showing a phase pattern of the diffractive grating according to a eighth embodiment.
Figure 18:
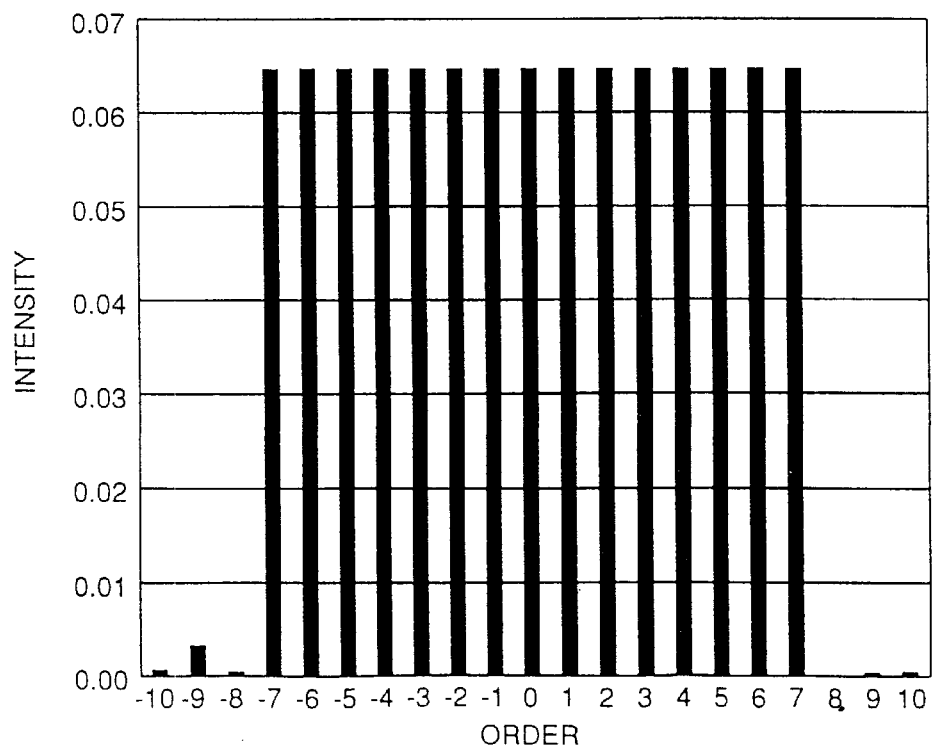
FIG. 18 is a graph showing a distribution of intensities of the divided beams according to the diffractive grating having the phase pattern shown in FIG. 17.

TABLE 15 shows data for the phase pattern of the eighth embodiment for dividing an incident beam into fifteen beams, and the data is shown graphically in FIG. 17. The intensity distribution of the eighth embodiment is shown in TABLE 16 and a graph in FIG. 18.

TABLE 15

| Coord. | δ | Coord. | δ | Coord. | δ |
|---|---|---|---|---|---|
| 0 | 0.00000 | 22 | 6.57449 | 43 | 5.84407 |
| 1 | 0.13568 | 23 | 6.52634 | 44 | 5.77096 |
| 2 | 0.44834 | 24 | 6.76652 | 45 | 5.70160 |
| 3 | 0.88163 | 25 | 7.51678 | 46 | 5.73259 |
| 4 | 1.30576 | 26 | 8.17152 | 47 | 5.86992 |
| 5 | 1.68261 | 27 | 8.33066 | 48 | 6.00010 |
| 6 | 2.06476 | 28 | 8.24053 | 49 | 6.05069 |
| 7 | 2.58479 | 29 | 7.93941 | 50 | 6.01035 |
| 8 | 3.41429 | 30 | 7.43741 | 51 | 5.82002 |
| 9 | 4.25901 | 31 | 6.90008 | 52 | 5.24391 |
| 10 | 4.76903 | 32 | 6.42146 | 53 | 4.21766 |
| 11 | 5.10604 | 33 | 5.81404 | 54 | 3.68439 |
| 12 | 5.38589 | 34 | 4.94279 | 55 | 3.40442 |
| 13 | 5.70998 | 35 | 4.37965 | 56 | 3.14066 |
| 14 | 6.36406 | 36 | 4.15254 | 57 | 2.74639 |
| 15 | 7.67823 | 37 | 4.10114 | 58 | 2.05398 |
| 16 | 8.23179 | 38 | 4.20216 | 59 | 1.25189 |
| 17 | 8.42421 | 39 | 4.57064 | 60 | 0.73750 |
| 18 | 8.48698 | 40 | 5.25321 | 61 | 0.40096 |
| 19 | 8.42208 | 41 | 5.70212 | 62 | 0.16205 |
| 20 | 8.03894 | 42 | 5.84742 | 63 | 0.02012 |
| 21 | 7.05405 | | | | |

TABLE 16

| Order | Intensity | Order | Intensity |
|---|---|---|---|
| −10 | 0.00062 | 1 | 0.06468 |
| −9 | 0.00326 | 2 | 0.06467 |
| −8 | 0.00041 | 3 | 0.06467 |
| −7 | 0.06468 | 4 | 0.06467 |
| −6 | 0.06469 | 5 | 0.06466 |
| −5 | 0.06467 | 6 | 0.06469 |
| −4 | 0.06467 | 7 | 0.06466 |
| −3 | 0.06466 | 8 | 0.00002 |
| −2 | 0.06467 | 9 | 0.00036 |
| −1 | 0.06467 | 10 | 0.00046 |
| 0 | 0.06467 | Diffraction Efficiency 97.01% | |

Ninth Embodiment

Figure 19:
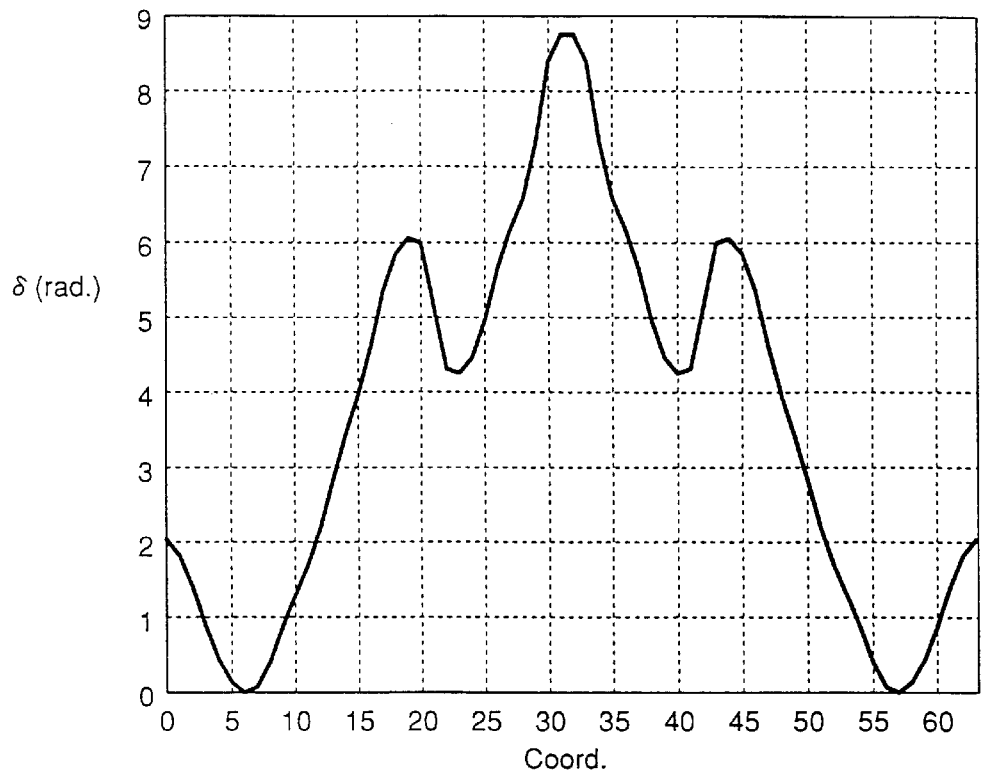
FIG. 19 is a graph showing a phase pattern of the diffractive grating according to a ninth embodiment.
Figure 20:
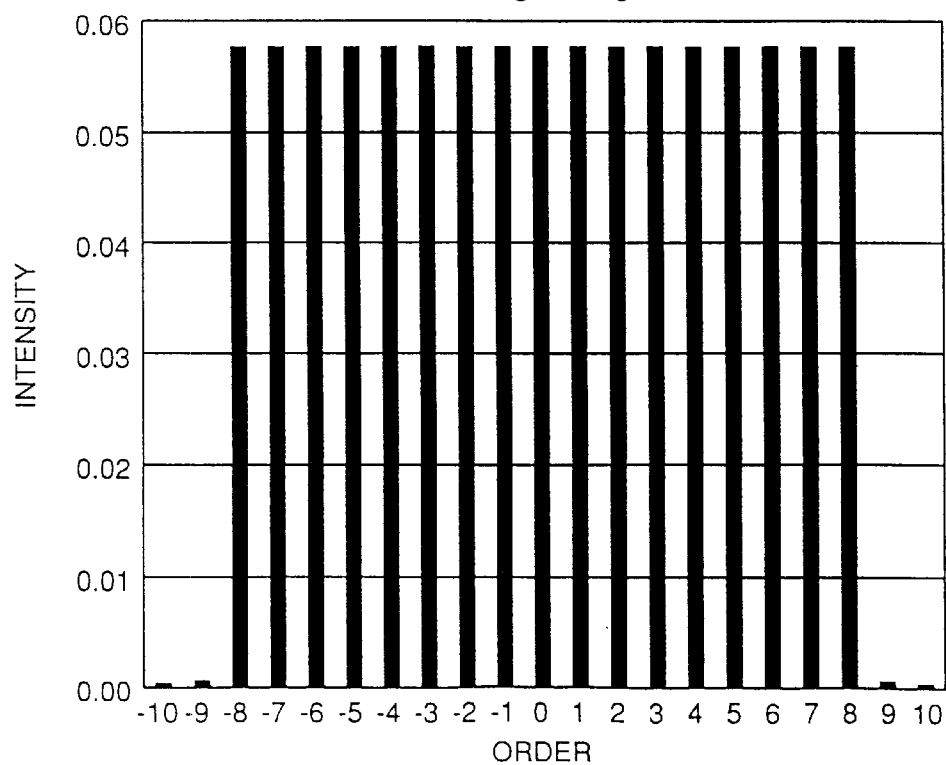
FIG. 20 is a graph showing a distribution of intensities of the divided beams according to the diffractive grating having the phase pattern shown in FIG. 19.

TABLE 17 shows data for the phase pattern of the ninth embodiment for dividing an incident beam into seventeen beams, and the data is shown graphically in FIG. 19. The intensity distribution of the ninth embodiment is shown in TABLE 18 and a graph in FIG. 20.

TABLE 17

| Coord. | δ | Coord. | δ | Coord. | δ |
|---|---|---|---|---|---|
| 0 | 2.03700 | 22 | 4.31850 | 43 | 5.99500 |
| 1 | 1.82850 | 23 | 4.25400 | 44 | 6.05700 |
| 2 | 1.40900 | 24 | 4.45850 | 45 | 5.85150 |
| 3 | 0.87800 | 25 | 4.96000 | 46 | 5.35650 |

TABLE 17-continued

| Coord. | δ | Coord. | δ | Coord. | δ |
|---|---|---|---|---|---|
| 4 | 0.43050 | 26 | 5.65950 | 47 | 4.60500 |
| 5 | 0.13400 | 27 | 6.17350 | 48 | 3.96350 |
| 6 | 0.00000 | 28 | 6.58600 | 49 | 3.43500 |
| 7 | 0.07350 | 29 | 7.32500 | 50 | 2.83450 |
| 8 | 0.40250 | 30 | 8.39250 | 51 | 2.19400 |
| 9 | 0.87750 | 31 | 8.75100 | 52 | 1.69400 |
| 10 | 1.29800 | 32 | 8.75100 | 53 | 1.29800 |
| 11 | 1.69400 | 33 | 8.39250 | 54 | 0.87750 |
| 12 | 2.19400 | 34 | 7.32500 | 55 | 0.40250 |
| 13 | 2.83450 | 35 | 6.58600 | 56 | 0.07350 |
| 14 | 3.43500 | 36 | 6.17350 | 57 | 0.00000 |
| 15 | 3.96350 | 37 | 5.65950 | 58 | 0.13400 |
| 16 | 4.60500 | 38 | 4.96000 | 59 | 0.43050 |
| 17 | 5.35650 | 39 | 4.45850 | 60 | 0.87800 |
| 18 | 5.85150 | 40 | 4.25400 | 61 | 1.40900 |
| 19 | 6.05700 | 41 | 4.31850 | 62 | 1.82850 |
| 20 | 5.99500 | 42 | 5.14850 | 63 | 2.03700 |
| 21 | 5.14850 | | | | |

TABLE 18

| Order | Intensity | Order | Intensity |
|---|---|---|---|
| −10 | 0.00038 | 1 | 0.05771 |
| −9 | 0.00060 | 2 | 0.05770 |
| −8 | 0.05770 | 3 | 0.05771 |
| −7 | 0.05769 | 4 | 0.05770 |
| −6 | 0.05771 | 5 | 0.05770 |
| −5 | 0.05770 | 6 | 0.05771 |
| −4 | 0.05770 | 7 | 0.05769 |
| −3 | 0.05771 | 8 | 0.05770 |
| −2 | 0.05770 | 9 | 0.00060 |
| −1 | 0.05771 | 10 | 0.00038 |
| 0 | 0.05771 | Diffraction Efficiency 98.10% | |

Tenth Embodiment

TABLE 19 shows data for the phase pattern of the tenth embodiment for dividing an incident beam into eight beams, and the data is shown graphically in FIG. 21. The phase pattern of the tenth embodiment is the inverted shape of the phase pattern in the first embodiment. The effective intensities and the diffraction efficiency are the identical to the first embodiment.

TABLE 19

| Coord. | δ | Coord. | δ | Coord. | δ |
|---|---|---|---|---|---|
| 0 | 6.20469 | 22 | 0.81724 | 43 | 0.31944 |
| 1 | 6.19885 | 23 | 0.80640 | 44 | 0.78802 |
| 2 | 6.05305 | 24 | 0.97404 | 45 | 1.32005 |
| 3 | 5.84840 | 25 | 1.34720 | 46 | 1.71562 |
| 4 | 5.61804 | 26 | 1.80715 | 47 | 1.92310 |
| 5 | 5.37195 | 27 | 2.14144 | 48 | 2.00063 |
| 6 | 5.11073 | 28 | 2.27186 | 49 | 2.01844 |
| 7 | 4.83414 | 29 | 2.24177 | 50 | 2.02938 |
| 8 | 4.54602 | 30 | 2.11918 | 51 | 2.06480 |
| 9 | 4.24744 | 31 | 1.94671 | 52 | 2.14885 |
| 10 | 3.94333 | 32 | 1.74459 | 53 | 2.28976 |
| 11 | 3.63568 | 33 | 1.52525 | 54 | 2.47194 |
| 12 | 3.32893 | 34 | 1.29444 | 55 | 2.65742 |
| 13 | 3.02473 | 35 | 1.05910 | 56 | 2.81005 |
| 14 | 2.72197 | 3G | 0.82553 | 57 | 2.91871 |
| 15 | 2.42525 | 37 | 0.60057 | 58 | 3.00825 |
| 16 | 2.13518 | 38 | 0.39240 | 59 | 3.15835 |
| 17 | 1.85663 | 39 | 0.20938 | 60 | 3.50412 |
| 18 | 1.59221 | 40 | 0.06762 | 61 | 4.21062 |
| 19 | 1.34606 | 41 | 0.00000 | 62 | 5.19568 |
| 20 | 1.12405 | 42 | 0.06089 | 63 | 5.92340 |
| 21 | 0.93984 | | | | |

Eleventh Embodiment

TABLE 20 shows data for the phase pattern of the eleventh embodiment for dividing an incident beam into three beams, and the data is shown graphically in FIG. 22. The phase pattern of the eleventh embodiment is the inverted shape of the phase pattern in the second embodiment. The effective intensities and the diffraction efficiency are the identical to the second embodiment.

TABLE 20

| Coord. | δ | Coord. | δ | Coord. | δ |
|---|---|---|---|---|---|
| 0 | 2.42003 | 22 | 0.20292 | 43 | 0.36133 |
| 1 | 2.41737 | 23 | 0.15027 | 44 | 0.47917 |
| 2 | 2.41069 | 24 | 0.10930 | 45 | 0.63686 |
| 3 | 2.40101 | 25 | 0.07753 | 46 | 0.83806 |
| 4 | .2.38624 | 26 | 0.05235 | 47 | 1.08038 |
| 5 | 2.36743 | 27 | 0.03354 | 48 | 1.33990 |
| 6 | 2.34275 | 28 | 0.01928 | 49 | 1.58172 |
| 7 | 2.31098 | 29 | 0.00960 | 50 | 1.78342 |
| 8 | 2.27002 | 30 | 0.00291 | 51 | 1.93962 |
| 9 | 2.21736 | 31 | 0.00000 | 52 | 2.05945 |
| 10 | 2.14912 | 32 | 0.00000 | 53 | 2.14912 |
| 11 | 2.05945 | 33 | 0.00291 | 54 | 2.21736 |
| 12 | 1.93962 | 34 | 0.00960 | 55 | 2.27002 |
| 13 | 1.78342 | 35 | 0.01928 | 56 | 2.31098 |
| 14 | 1.58172 | 36 | 0.03354 | 57 | 2.34275 |
| 15 | 1.33990 | 37 | 0.05235 | 58 | 2.36743 |
| 16 | 1.08038 | 38 | 0.07753 | 59 | 2.38624 |
| 17 | 0.83806 | 39 | 0.10930 | 60 | 2.40101 |
| 18 | 0.63686 | 40 | 0.15027 | 61 | 2.41069 |
| 19 | 0.47917 | 41 | 0.20292 | 62 | 2.41737 |
| 20 | 0.36133 | 42 | 0.27067 | 63 | 2.42003 |
| 21 | 0.27067 | | | | |

Twelfth Embodiment

Figure 23:
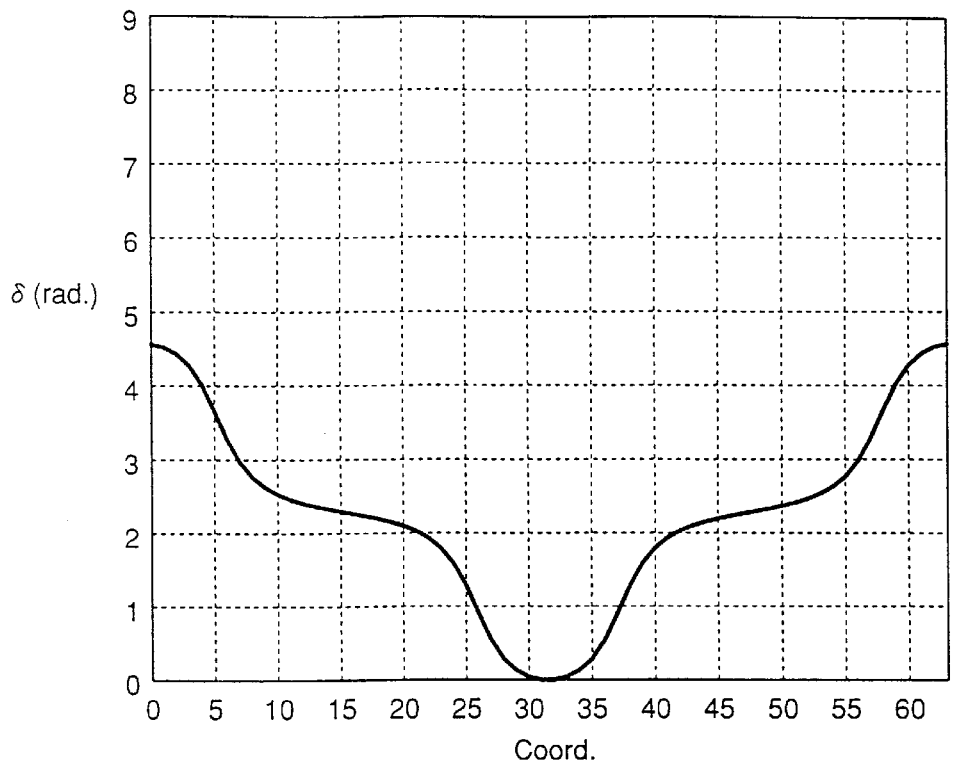
FIG. 23 is a graph showing a phase pattern of the diffractive grating according to a twelfth embodiment.

TABLE 21 shows data for the phase pattern of the twelfth embodiment for dividing an incident beam into five beams, and the data is shown graphically in FIG. 23. The phase pattern of the twelfth embodiment is the inverted shape of the phase pattern in the third embodiment. The effective intensities and the diffraction efficiency are the identical to the third embodiment.

TABLE 21

| Coord. | δ | Coord. | δ | Coord. | δ |
|---|---|---|---|---|---|
| 0 | 4.56329 | 22 | 1.93737 | 43 | 2.10049 |
| 1 | 4.52405 | 23 | 1.79889 | 44 | 2.15274 |
| 2 | 4.43502 | 24 | 1.59145 | 45 | 2.19579 |
| 3 | 4.27650 | 25 | 1.28629 | 46 | 2.23209 |
| 4 | 4.02036 | 26 | 0.90202 | 47 | 2.26556 |
| 5 | 3.66165 | 27 | 0.54281 | 48 | 2.29785 |
| 6 | 3.27762 | 28 | 0.28691 | 49 | 2.33108 |
| 7 | 2.97196 | 29 | 0.12889 | 50 | 2.36813 |
| 8 | 2.76452 | 30 | 0.03937 | 51 | 2.40992 |
| 9 | 2.62604 | 31 | 0.00000 | 52 | 2.46267 |
| 10 | 2.53167 | 32 | 0.00000 | 53 | 2.53167 |
| 11 | 2.46267 | 33 | 0.03937 | 54 | 2.62604 |
| 12 | 2.40992 | 34 | 0.12889 | 55 | 2.76452 |
| 13 | 2.36813 | 35 | 0.28691 | 56 | 2.97196 |
| 14 | 2.33108 | 36 | 0.54281 | 57 | 3.27762 |
| 15 | 2.29785 | 37 | 0.90202 | 58 | 3.66165 |
| 16 | 2.26556 | 38 | 1.28629 | 59 | 4.02036 |
| 17 | 2.23209 | 39 | 1.59145 | 60 | 4.27650 |
| 18 | 2.19579 | 40 | 1.79889 | 61 | 4.43502 |
| 19 | 2.15274 | 41 | 1.93737 | 62 | 4.52405 |
| 20 | 2.10049 | 42 | 2.03199 | 63 | 4.56329 |
| 21 | 2.03199 | | | | |

Thirteenth Embodiment

Figure 24:
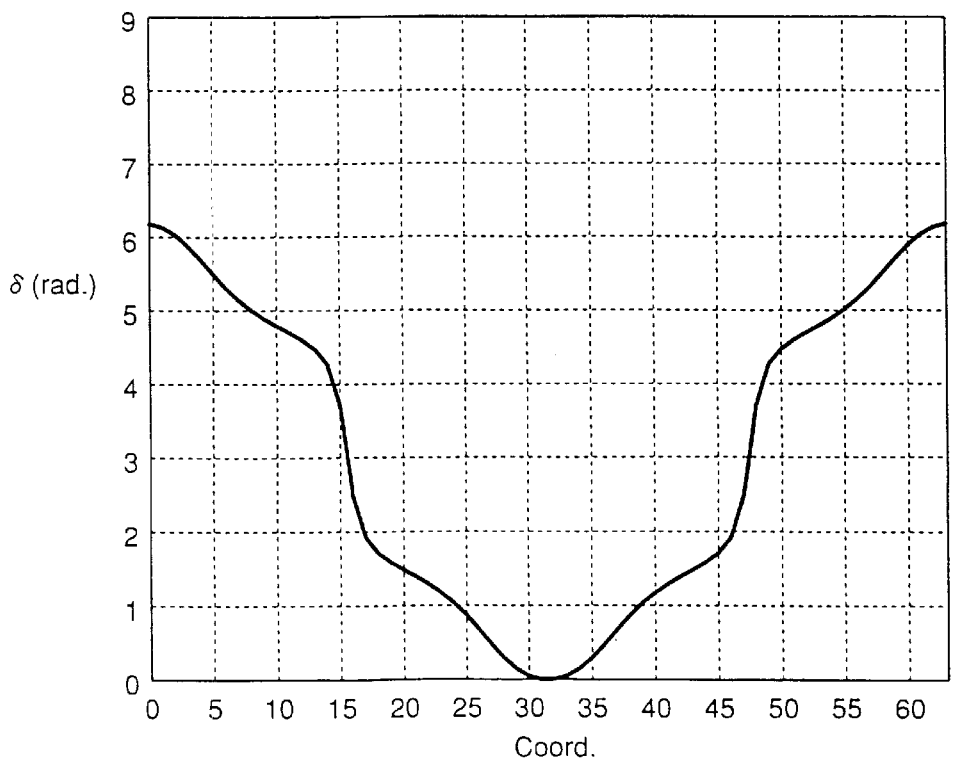
FIG. 24 is a graph showing a phase pattern of the diffractive grating according to a thirteenth embodiment.

TABLE 22 shows data for the phase pattern of the thirteenth embodiment for dividing an incident beam into seven beams, and the data is shown graphically in FIG. 24. The phase pattern of the thirteenth embodiment is the inverted shape of the phase pattern in the fourth embodiment. The effective intensities and the diffraction efficiency are the identical to the fourth embodiment.

TABLE 22

| Coord. | δ | Coord. | δ | Coord. | δ |
|---|---|---|---|---|---|
| 0 | 6.18521 | 22 | 1.29052 | 43 | 1.48538 |
| 1 | 6.13494 | 23 | 1.17510 | 44 | 1.58377 |
| 2 | 6.03514 | 24 | 1.03683 | 45 | 1.70976 |
| 3 | 5.88700 | 25 | 0.87138 | 46 | 1.92059 |
| 4 | 5.70273 | 26 | 0.68174 | 47 | 2.47896 |
| 5 | 5.50372 | 27 | 0.48273 | 48 | 3.70700 |
| 6 | 5.31308 | 28 | 0.29795 | 49 | 4.26436 |
| 7 | 5.14763 | 29 | 0.14982 | 50 | 4.47470 |
| 8 | 5.00935 | 30 | 0.05002 | 51 | 4.60069 |
| 9 | 4.89343 | 31 | 0.00000 | 52 | 4.69908 |
| 10 | 4.79319 | 32 | 0.00000 | 53 | 4.79319 |
| 11 | 4.69908 | 33 | 0.05002 | 54 | 4.89343 |
| 12 | 4.60069 | 34 | 0.14982 | 55 | 5.00935 |
| 13 | 4.47470 | 35 | 0.29795 | 56 | 5.14763 |
| 14 | 4.26436 | 36 | 0.48273 | 57 | 5.31308 |
| 15 | 3.70700 | 37 | 0.68174 | 58 | 5.50372 |
| 16 | 2.47896 | 38 | 0.87138 | 59 | 5.70273 |
| 17 | 1.92059 | 39 | 1.03683 | 60 | 5.88700 |
| 18 | 1.70976 | 40 | 1.17510 | 61 | 6.03514 |
| 19 | 1.58377 | 41 | 1.29052 | 62 | 6.13494 |
| 20 | 1.48538 | 42 | 1.39077 | 63 | 6.18521 |
| 21 | 1.39077 | | | | |

Fourteenth Embodiment

Figure 25:
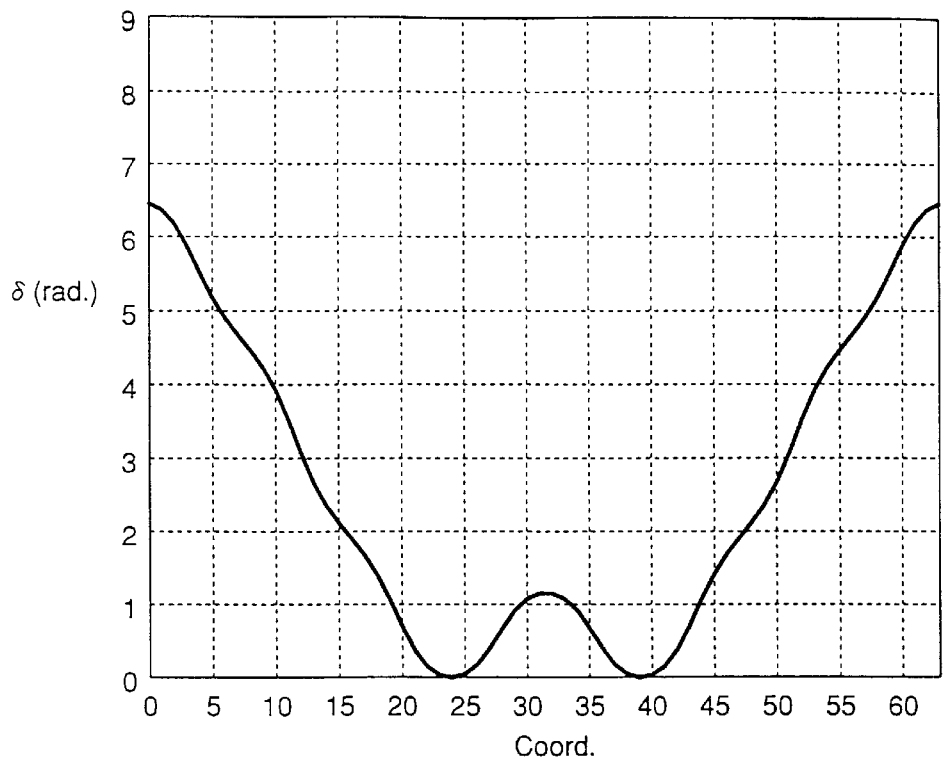
FIG. 25 is a graph showing a phase pattern of the diffractive grating according to a fourteenth embodiment.

TABLE 23 shows data for the phase pattern of the fourteenth embodiment for dividing an incident beam into nine beams, and the data is shown graphically in FIG. 25. The phase pattern of the fourteenth embodiment is the inverted shape of the phase pattern in the fifth embodiment. The effective intensities and the diffraction efficiency are the identical to the fifth embodiment.

TABLE 23

| Coord. | δ | Coord. | δ | Coord. | δ |
|---|---|---|---|---|---|
| 0 | 6.45338 | 22 | 0.15369 | 43 | 0.70455 |
| 1 | 6.36611 | 23 | 0.03277 | 44 | 1.07744 |
| 2 | 6.17181 | 24 | 0.00000 | 45 | 1.41443 |
| 3 | 5.87217 | 25 | 0.04955 | 46 | 1.68126 |
| 4 | 5.50790 | 26 | 0.18441 | 47 | 1.90463 |
| 5 | 5.17139 | 27 | 0.40890 | 48 | 2.11717 |
| 6 | 4.89975 | 28 | 0.67712 | 49 | 2.35803 |
| 7 | 4.67630 | 29 | 0.91799 | 50 | 2.66487 |
| 8 | 4.46352 | 30 | 1.07669 | 51 | 3.06736 |
| 9 | 4.22610 | 31 | 1.15367 | 52 | 3.52225 |
| 10 | 3.92236 | 32 | 1.15367 | 53 | 3.92236 |
| 11 | 3.52225 | 33 | 1.07669 | 54 | 4.22610 |
| 12 | 3.06736 | 34 | 0.91799 | 55 | 4.46352 |
| 13 | 2.66487 | 35 | 0.67712 | 56 | 4.67630 |
| 14 | 2.35803 | 36 | 0.40890 | 57 | 4.89975 |
| 15 | 2.11717 | 37 | 0.18441 | 58 | 5.17139 |
| 16 | 1.90463 | 38 | 0.04955 | 59 | 5.50790 |
| 17 | 1.68126 | 39 | 0.00000 | 60 | 5.87217 |
| 18 | 1.41443 | 40 | 0.03277 | 61 | 6.17181 |
| 19 | 1.07744 | 41 | 0.15369 | 62 | 6.36611 |
| 20 | 0.70455 | 42 | 0.37594 | 63 | 6.45338 |
| 21 | 0.37594 | | | | |

Fifteenth Embodiment

Figure 26:
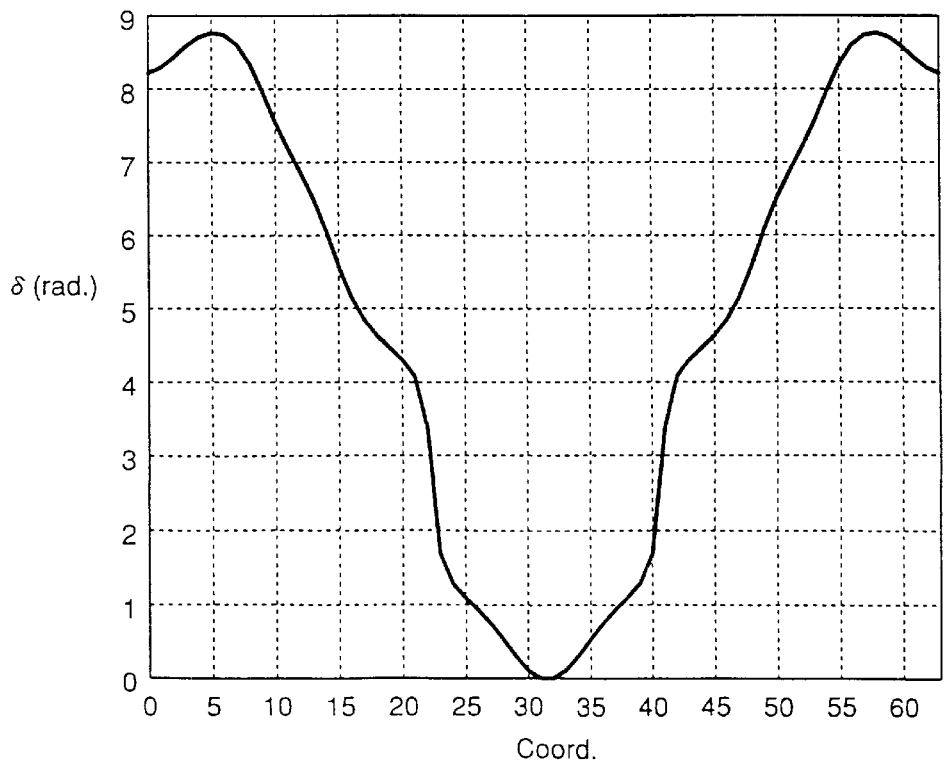
FIG. 26 is a graph showing a phase pattern of the diffractive grating according to a fifteenth embodiment.

TABLE 24 shows data for the phase pattern of the fifteenth embodiment for dividing an incident beam into eleven beams, and the data is shown graphically in FIG. 26. The phase pattern of the fifteenth embodiment is the inverted shape of the phase pattern in the sixth embodiment. The effective intensities and the diffraction efficiency are the identical to the sixth embodiment.

TABLE 24

| Coord. | δ | Coord. | δ | Coord. | δ |
|---|---|---|---|---|---|
| 0 | 8.21915 | 22 | 3.36860 | 43 | 4.30105 |
| 1 | 8.29565 | 23 | 1.69060 | 44 | 4.46335 |
| 2 | 8.43220 | 24 | 1.28945 | 45 | 4.63285 |
| 3 | 8.58820 | 25 | 1.09945 | 46 | 4.85015 |
| 4 | 8.71300 | 26 | 0.93300 | 47 | 5.15515 |
| 5 | 8.76950 | 27 | 0.75050 | 48 | 5.57935 |
| 6 | 8.74045 | 28 | 0.53480 | 49 | 6.06785 |
| 7 | 8.60495 | 29 | 0.30580 | 50 | 6.50165 |
| 8 | 8.34450 | 30 | 0.10950 | 51 | 6.85815 |
| 9 | 7.96600 | 31 | 0.00000 | 52 | 7.19025 |
| 10 | 7.55575 | 32 | 0.00000 | 53 | 7.55575 |
| 11 | 7.19025 | 33 | 0.10950 | 54 | 7.96600 |
| 12 | 6.85815 | 34 | 0.30580 | 55 | 8.34450 |
| 13 | 6.50165 | 35 | 0.53480 | 56 | 8.60495 |
| 14 | 6.06785 | 36 | 0.75050 | 57 | 8.74045 |
| 15 | 5.57935 | 37 | 0.93300 | 58 | 8.76950 |
| 16 | 5.15515 | 38 | 1.09945 | 59 | 8.71300 |
| 17 | 4.85015 | 39 | 1.28945 | 60 | 8.58820 |
| 18 | 4.63285 | 40 | 1.69060 | 61 | 8.43220 |
| 19 | 4.46335 | 41 | 3.36860 | 62 | 8.29565 |
| 20 | 4.30105 | 42 | 4.07805 | 63 | 8.21915 |
| 21 | 4.07805 | | | | |

Sixteenth Embodiment

Figure 27:
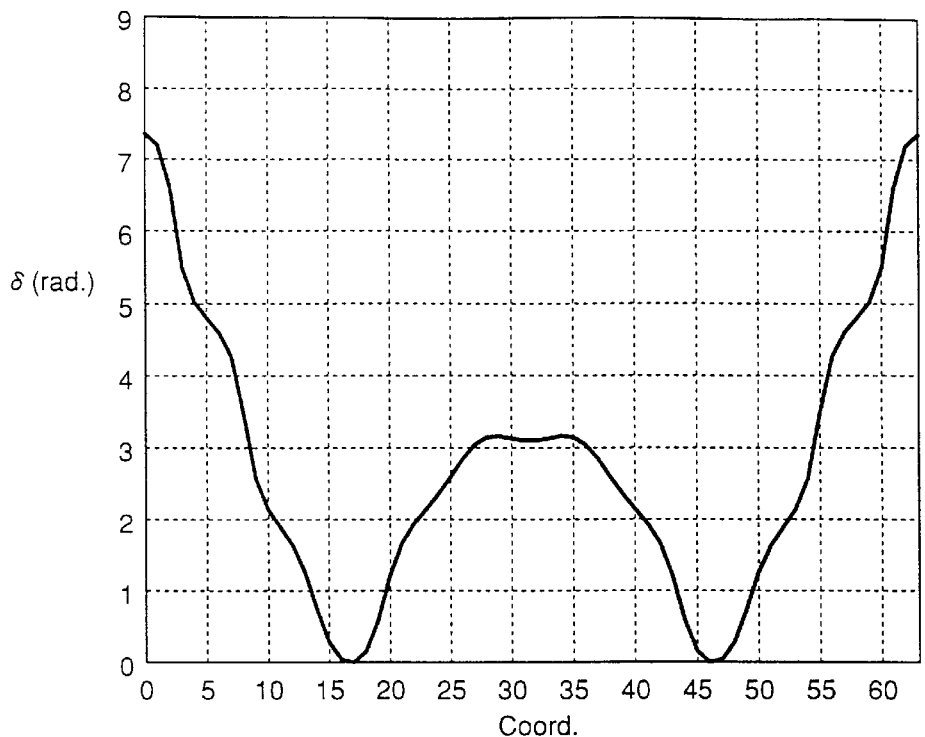
FIG. 27 is a graph showing a phase pattern of the diffractive grating according to a sixteenth embodiment.

TABLE 25 shows data for the phase pattern of the sixteenth embodiment for dividing an incident beam into thirteen beams, and the data is shown graphically in FIG. 27. The phase pattern of the sixteenth embodiment is the inverted shape of the phase pattern in the seventh embodiment. The effective intensities and the diffraction efficiency are the identical to the seventh embodiment.

TABLE 26

| Coord. | δ | Coord. | δ | Coord. | δ |
|---|---|---|---|---|---|
| 0 | 8.48698 | 22 | 1.91249 | 43 | 2.64291 |
| 1 | 8.35130 | 23 | 1.96064 | 44 | 2.71602 |
| 2 | 8.03864 | 24 | 1.72046 | 45 | 2.78538 |
| 3 | 7.60535 | 25 | 0.97020 | 46 | 2.75439 |
| 4 | 7.18122 | 26 | 0.31546 | 47 | 2.61706 |
| 5 | 6.80437 | 27 | 0.15632 | 48 | 2.48688 |
| 6 | 6.42222 | 28 | 0.24645 | 49 | 2.43629 |
| 7 | 5.90219 | 29 | 0.54757 | 50 | 2.47663 |
| 8 | 5.07269 | 30 | 1.04957 | 51 | 2.66696 |
| 9 | 4.22797 | 31 | 1.58690 | 52 | 3.24307 |
| 10 | 3.71795 | 32 | 2.06552 | 53 | 4.26932 |
| 11 | 3.38094 | 33 | 2.67294 | 54 | 4.80259 |
| 12 | 3.10109 | 34 | 3.54419 | 55 | 5.08256 |
| 13 | 2.77700 | 35 | 4.10733 | 56 | 5.34632 |
| 14 | 2.12292 | 36 | 4.33444 | 57 | 5.74059 |
| 15 | 0.80875 | 37 | 4.38584 | 58 | 6.43300 |
| 16 | 0.25519 | 38 | 4.28482 | 59 | 7.23509 |
| 17 | 0.06277 | 39 | 3.91634 | 60 | 7.74948 |
| 18 | 0.00000 | 40 | 3.23377 | 61 | 8.08602 |
| 19 | 0.06490 | 41 | 2.78486 | 62 | 8.32493 |
| 20 | 0.44804 | 42 | 2.63956 | 63 | 8.46686 |
| 21 | 1.43293 | | | | |

Seventeenth Embodiment

Figure 28:
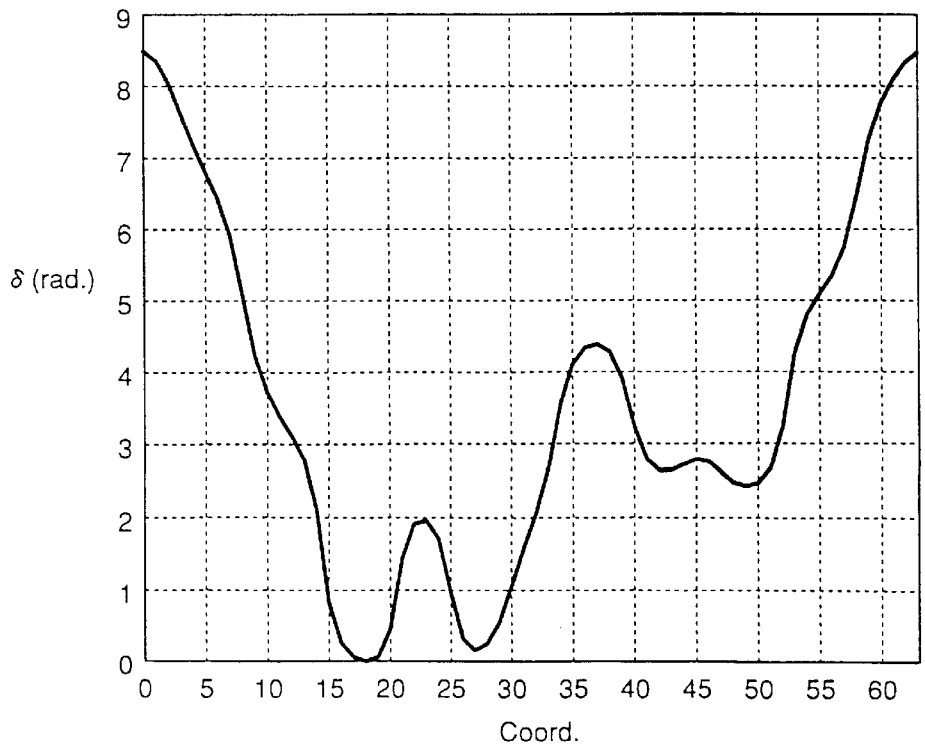
FIG. 28 is a graph showing a phase pattern of the diffractive grating according to a seventeenth embodiment.

TABLE 26 shows data for the phase pattern of the seventeenth embodiment for dividing an incident beam into fifteen beams, and the data is shown graphically in FIG. 28. The phase pattern of the seventeenth embodiment is the inverted shape of the phase pattern in the eighth embodiment. The effective intensities and the diffraction efficiency are the identical to the eighth embodiment.

TABLE 26

| Coord. | δ | Coord. | δ | Coord. | δ |
|---|---|---|---|---|---|
| 0 | 8.48698 | 22 | 1.91249 | 43 | 2.64291 |
| 1 | 8.35130 | 23 | 1.96064 | 44 | 2.71602 |
| 2 | 8.03864 | 24 | 1.72046 | 45 | 2.78538 |
| 3 | 7.60535 | 25 | 0.97020 | 46 | 2.75439 |
| 4 | 7.18122 | 26 | 0.31546 | 47 | 2.61706 |
| 5 | 6.80437 | 27 | 0.15632 | 48 | 2.48688 |
| 6 | 6.42222 | 28 | 0.24645 | 49 | 2.43629 |
| 7 | 5.90219 | 29 | 0.54757 | 50 | 2.47663 |
| 8 | 5.07269 | 30 | 1.04957 | 51 | 2.66696 |
| 9 | 4.22797 | 31 | 1.58690 | 52 | 3.24307 |
| 10 | 3.71795 | 32 | 2.06552 | 53 | 4.26932 |
| 11 | 3.38094 | 33 | 2.67294 | 54 | 4.80259 |
| 12 | 3.10109 | 34 | 3.54419 | 55 | 5.08256 |
| 13 | 2.77700 | 35 | 4.10733 | 56 | 5.34632 |
| 14 | 2.12292 | 36 | 4.33444 | 57 | 5.74059 |
| 15 | 0.80875 | 37 | 4.38584 | 58 | 6.43300 |
| 16 | 0.25519 | 38 | 4.28482 | 59 | 7.23509 |
| 17 | 0.06277 | 39 | 3.91634 | 60 | 7.74948 |
| 18 | 0.00000 | 40 | 3.23377 | 61 | 8.08602 |
| 19 | 0.06490 | 41 | 2.78486 | 62 | 8.32493 |
| 20 | 0.44804 | 42 | 2.63956 | 63 | 8.46686 |
| 21 | 1.43293 | | | | |

Eighteenth Embodiment

Figure 29:
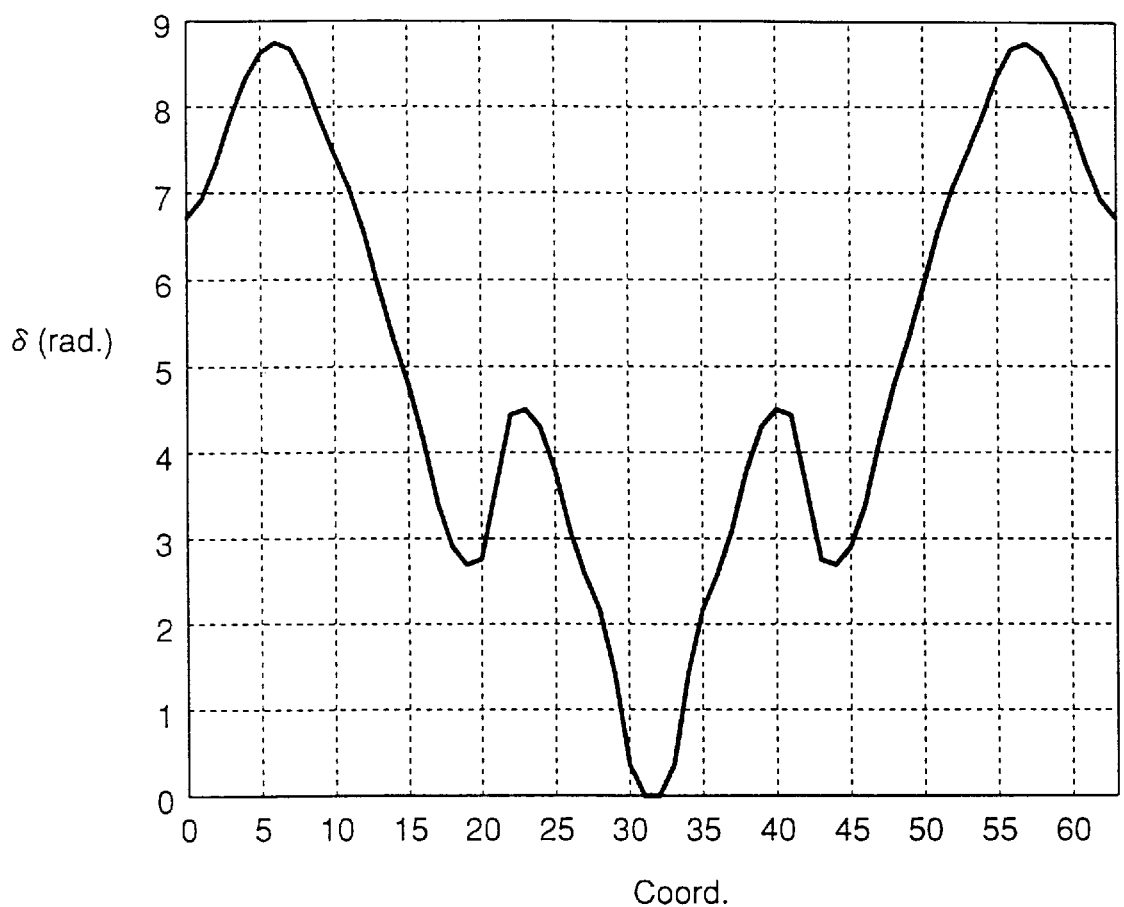
FIG. 29 is a graph showing a phase pattern of the diffractive grating according to a eighteenth embodiment.

TABLE 27 shows data for the phase pattern of the eighteenth embodiment for dividing an incident beam into seventeen beams, and the data is shown graphically in FIG. 29. The phase pattern of the eighteenth embodiment is the inverted shape of the phase pattern in the ninth embodiment. The effective intensities and the diffraction efficiency are the identical to the ninth embodiment.

TABLE 27

| Coord. | δ | Coord. | δ | Coord. | δ |
|---|---|---|---|---|---|
| 0 | 6.71400 | 22 | 4.43250 | 43 | 2.75600 |
| 1 | 6.92250 | 23 | 4.49700 | 44 | 2.69400 |
| 2 | 7.34200 | 24 | 4.29250 | 45 | 2.89950 |
| 3 | 7.87300 | 25 | 3.79100 | 46 | 3.39450 |
| 4 | 8.32050 | 26 | 3.09150 | 47 | 4.14600 |
| 5 | 8.61700 | 27 | 2.57750 | 48 | 4.78750 |
| 6 | 8.75100 | 28 | 2.16500 | 49 | 5.31600 |
| 7 | 8.67750 | 29 | 1.42600 | 50 | 5.91650 |
| 8 | 8.34850 | 30 | 0.35850 | 51 | 6.55700 |
| 9 | 7.87350 | 31 | 0.00000 | 52 | 7.05700 |
| 10 | 7.45300 | 32 | 0.00000 | 53 | 7.45300 |
| 11 | 7.05700 | 33 | 0.35850 | 54 | 7.87350 |
| 12 | 6.55700 | 34 | 1.42600 | 55 | 8.34850 |
| 13 | 5.91650 | 35 | 2.16500 | 56 | 8.67750 |
| 14 | 5.31600 | 36 | 2.57750 | 57 | 8.75100 |
| 15 | 4.78750 | 37 | 3.09150 | 58 | 8.61700 |
| 16 | 4.14600 | 38 | 3.79100 | 59 | 8.32050 |
| 17 | 3.39450 | 39 | 4.29250 | 60 | 7.87300 |
| 18 | 2.89950 | 40 | 4.49700 | 61 | 7.34200 |
| 19 | 2.69400 | 41 | 4.43250 | 62 | 6.92250 |
| 20 | 2.75600 | 42 | 3.60250 | 63 | 6.71400 |
| 21 | 3.60250 | | | | |

As described above, the diffraction efficiency is more than 92% in each embodiment and reaches as high as 99% in theory. The indicated diffraction efficiencies are theoretical values when the phase patterns are accurately formed according to the indicated values in the tables. The larger the difference between the actual shape of the phase patterns and the designed values are, the lower the diffraction efficiencies are.

In order to control deterioration of the diffraction efficiency to be smaller than 10%, the tolerance (the allowable range of the processing error) is about 2% as the unit of the phase difference. For example, when the range of the height of the phase pattern is 1 μm, it requires accuracy of 0.02 μm or smaller.

The present disclosure relates to the subject matter contained in Japanese Patent Application No. HEI 10-63755, filed on Mar. 13, 1998, which is expressly incorporated herein by reference in its entirety.

What is claimed is:

1. A beam splitting element, which comprising:

a transparent substrate; and a diffractive grating formed on said substrate for dividing an incident beam into a plurality of diffracted beams, said diffractive grating having a corrugated surface having a plurality of phase patterns arranged in parallel at a predetermined fixed pitch, wherein each of said plurality of phase patterns is formed such that a phase difference δ (unit: radian) at a coordinate (Coord.) falls within an allowable range around a center value indicated in a table below when a width of said phase pattern is divided into 64 coordinates:

| Coord. | δ | Coord. | δ | Coord. | δ |
|---|---|---|---|---|---|
| 0 | 0.00000 | 22 | 5.38745 | 43 | 5.88525 |
| 1 | 0.00584 | 23 | 5.39829 | 44 | 5.41667 |
| 2 | 0.15164 | 24 | 5.23065 | 45 | 4.88464 |
| 3 | 0.35629 | 25 | 4.85749 | 46 | 4.48907 |
| 4 | 0.58665 | 26 | 4.39754 | 47 | 4.28159 |
| 5 | 0.83274 | 27 | 4.06325 | 48 | 4.20466 |
| 6 | 1.09396 | 28 | 3.93283 | 49 | 4.18625 |
| 7 | 1.37055 | 29 | 3.96292 | 50 | 4.17531 |
| 8 | 1.65867 | 30 | 4.08551 | 51 | 4.13989 |
| 9 | 1.95725 | 31 | 4.25798 | 52 | 4.05584 |
| 10 | 2.26136 | 32 | 4.46010 | 53 | 3.91493 |
| 11 | 2.56901 | 33 | 4.67944 | 54 | 3.73275 |
| 12 | 2.87576 | 34 | 4.91025 | 55 | 3.54727 |
| 13 | 3.17996 | 35 | 5.14559 | 56 | 3.39464 |
| 14 | 3.48272 | 36 | 5.37916 | 57 | 3.28598 |
| 15 | 3.77944 | 37 | 5.60412 | 58 | 3.19644 |
| 16 | 4.06951 | 38 | 5.81229 | 59 | 3.04634 |
| 17 | 4.34806 | 39 | 5.99531 | 60 | 2.70057 |
| 18 | 4.61248 | 40 | 6.13707 | 61 | 1.99407 |
| 19 | 4.85863 | 41 | 6.20469 | 62 | 1.00901 |
| 20 | 5.08064 | 42 | 6.14380 | 63 | 0.28129 |
| 21 | 5.26485, and | | | | | wherein said diffractive grating divides said incident beam into eight beams.

2. A beam splitting element, which comprising:

a transparent substrate; and a diffractive grating formed on said substrate for dividing an incident beam into a plurality of diffracted beams, said diffractive grating having a corrugated surface having a plurality of phase patterns arranged in parallel at a predetermined fixed pitch, wherein each of said plurality of phase patterns is formed such that a phase difference δ (unit: radian) at a coordinate (Coord.) falls within an allowable range around a center value indicated in a table below when a width of said phase pattern is divided into 64 coordinates:

| Coord. | δ | Coord. | δ | Coord. | δ |
|---|---|---|---|---|---|
| 0 | 0.00000 | 22 | 2.21711 | 43 | 2.05870 |
| 1 | 0.00266 | 23 | 2.26976 | 44 | 1.94086 |
| 2 | 0.00934 | 24 | 2.31073 | 45 | 1.78317 |
| 3 | 0.01902 | 25 | 2.34250 | 46 | 1.58197 |
| 4 | 0.03379 | 26 | 2.36768 | 47 | 1.33965 |
| 5 | 0.05260 | 27 | 2.38649 | 48 | 1.08013 |

-continued

| Coord. | δ | Coord. | δ | Coord. | δ |
|---|---|---|---|---|---|
| 6 | 0.07728 | 28 | 2.40075 | 49 | 0.83831 |
| 7 | 0.10905 | 29 | 2.41043 | 50 | 0.63661 |
| 8 | 0.15001 | 30 | 2.41712 | 51 | 0.48041 |
| 9 | 0.20267 | 31 | 2.42003 | 52 | 0.36058 |
| 10 | 0.27091 | 32 | 2.42003 | 53 | 0.27091 |
| 11 | 0.36058 | 33 | 2.41712 | 54 | 0.20267 |
| 12 | 0.48041 | 34 | 2.41043 | 55 | 0.15001 |
| 13 | 0.63661 | 35 | 2.40075 | 56 | 0.10905 |
| 14 | 0.83831 | 36 | 2.38649 | 57 | 0.07728 |
| 15 | 1.08013 | 37 | 2.36768 | 58 | 0.05260 |
| 16 | 1.33965 | 38 | 2.34250 | 59 | 0.03379 |
| 17 | 1.58197 | 39 | 2.31073 | 60 | 0.01902 |
| 18 | 1.78317 | 40 | 2.26976 | 61 | 0.00934 |
| 19 | 1.94086 | 41 | 2.21711 | 62 | 0.00266 |
| 20 | 2.05870 | 42 | 2.14936 | 63 | 0.00000 |
| 21 | 2.14936, and | | | | | wherein said diffractive grating divides said incident beam into three beams.

3. A beam splitting element, which comprising:

a transparent substrate; and a diffractive grating formed on said substrate for dividing an incident beam into a plurality of diffracted beams, said diffractive grating having a corrugated surface having a plurality of phase patterns arranged in parallel at a predetermined fixed pitch, wherein each of said plurality of phase patterns is formed such that a phase difference δ (unit: radian) at a coordinate (Coord.) falls within an allowable range around a center value indicated in a table below when a width of said phase pattern is divided into 64 coordinates:

| Coord. | δ | Coord. | δ | Coord. | δ |
|---|---|---|---|---|---|
| 0 | 7.35715 | 22 | 1.94093 | 43 | 1.21765 |
| 1 | 0.03924 | 23 | 2.76440 | 44 | 2.41055 |
| 2 | 0.12827 | 24 | 2.97184 | 45 | 2.36750 |
| 3 | 0.28679 | 25 | 3.27700 | 46 | 2.33120 |
| 4 | 0.54293 | 26 | 3.66127 | 47 | 2.29773 |
| 5 | 0.90164 | 27 | 4.02048 | 48 | 2.26544 |
| 6 | 1.28567 | 28 | 4.27638 | 49 | 2.23221 |
| 7 | 1.59133 | 29 | 4.43440 | 50 | 2.19516 |
| 8 | 1.79877 | 30 | 4.52392 | 51 | 2.15337 |
| 9 | 1.93725 | 31 | 4.56329 | 52 | 2.10062 |
| 10 | 2.03162 | 32 | 4.56329 | 53 | 2.03162 |
| 11 | 2.10062 | 33 | 4.52392 | 54 | 1.93725 |
| 12 | 2.15337 | 34 | 4.43440 | 55 | 1.79877 |
| 13 | 2.19516 | 35 | 4.27638 | 56 | 1.59133 |
| 14 | 2.23221 | 36 | 4.02048 | 57 | 1.28567 |
| 15 | 2.26544 | 37 | 3.66127 | 58 | 0.90164 |
| 16 | 2.29773 | 38 | 3.27700 | 59 | 0.54293 |
| 17 | 2.33120 | 39 | 2.97184 | 60 | 0.28679 |
| 18 | 2.36750 | 40 | 2.76440 | 61 | 0.12827 |
| 19 | 2.41055 | 41 | 2.62592 | 62 | 0.03924 |
| 20 | 2.46280 | 42 | 2.53130 | 63 | 0.00000 |
| 21 | 2.53130, and | | | | | wherein said diffractive grating divides said incident beam into five beams.

4. A beam splitting element, which comprising:

a transparent substrate; and a diffractive grating formed on said substrate for dividing an incident beam into a plurality of diffracted beams, said diffractive grating having a corrugated surface having a plurality of phase patterns arranged in parallel at a predetermined fixed pitch, wherein each of said plurality of phase patterns is formed such that a phase difference δ (unit: radian) at a coordinate (Coord.) falls within an allowable range around a center value indicated in a table below when a width of said phase pattern is divided into 64 coordinates:

| Coord. | δ | Coord. | δ | Coord. | δ |
|---|---|---|---|---|---|
| 0 | 0.00000 | 22 | 4.89469 | 43 | 4.69983 |
| 1 | 0.05027 | 23 | 5.01011 | 44 | 4.60144 |
| 2 | 0.15007 | 24 | 5.14838 | 45 | 4.47545 |
| 3 | 0.29821 | 25 | 5.31383 | 46 | 4.26462 |
| 4 | 0.48248 | 26 | 5.50347 | 47 | 3.70625 |
| 5 | 0.68149 | 27 | 5.70248 | 48 | 2.47821 |
| 6 | 0.87213 | 28 | 5.88726 | 49 | 1.92085 |
| 7 | 1.03758 | 29 | 6.03539 | 50 | 1.71051 |
| 8 | 1.17586 | 30 | 6.13519 | 51 | 1.58452 |
| 9 | 1.29178 | 31 | 6.10521 | 52 | 1.48613 |
| 10 | 1.39202 | 32 | 6.18521 | 53 | 1.39202 |
| 11 | 1.48613 | 33 | 6.13519 | 54 | 1.29178 |
| 12 | 1.58452 | 34 | 6.03539 | 55 | 1.17586 |
| 13 | 1.71051 | 35 | 5.88726 | 56 | 1.03758 |
| 14 | 1.92085 | 36 | 5.70248 | 57 | 0.87213 |
| 15 | 2.47821 | 37 | 5.50347 | 58 | 0.68149 |
| 16 | 3.70625 | 38 | 5.31383 | 59 | 0.48248 |
| 17 | 4.26462 | 39 | 5.14838 | 60 | 0.29821 |
| 18 | 4.47545 | 40 | 5.01011 | 61 | 0.15007 |
| 19 | 4.60144 | 41 | 4.89469 | 62 | 0.05027 |
| 20 | 4.69983 | 42 | 4.79444 | 63 | 0.00000 |
| 21 | 4.79444, and | | | | | wherein said diffractive grating divides said incident beam into seven beams.

5. A beam splitting element, which comprising:

a transparent substrate; and a diffractive grating formed on said substrate for dividing an incident beam into a plurality of diffracted beams, said diffractive grating having a corrugated surface having a plurality of phase patterns arranged in parallel at a predetermined fixed pitch, wherein each of said plurality of phase patterns is formed such that a phase difference δ (unit: radian) at a coordinate (Coord.) falls within an allowable range around a center value indicated in a table below when a width of said phase pattern is divided into 64 coordinates:

| Coord. | δ | Coord. | δ | Coord. | δ |
|---|---|---|---|---|---|
| 0 | 0.00000 | 22 | 6.29969 | 43 | 5.74883 |
| 1 | 0.08727 | 23 | 6.42060 | 44 | 5.37594 |
| 2 | 0.28157 | 24 | 6.45338 | 45 | 5.03895 |
| 3 | 0.58121 | 25 | 6.40383 | 46 | 4.77212 |
| 4 | 0.94548 | 26 | 6.26897 | 47 | 4.54875 |
| 5 | 1.28199 | 27 | 6.04448 | 48 | 4.33621 |
| 6 | 1.55363 | 28 | 5.77626 | 49 | 4.09535 |
| 7 | 1.77708 | 29 | 5.53539 | 50 | 3.78851 |
| 8 | 1.98986 | 30 | 5.37669 | 51 | 3.38602 |
| 9 | 2.22728 | 31 | 5.29971 | 52 | 2.93113 |
| 10 | 2.53102 | 32 | 5.29971 | 53 | 2.53102 |
| 11 | 2.93113 | 33 | 5.37669 | 54 | 2.22728 |
| 12 | 3.38602 | 34 | 5.53539 | 55 | 1.98986 |
| 13 | 3.78851 | 35 | 5.77626 | 56 | 1.77708 |
| 14 | 4.09535 | 36 | 6.04448 | 57 | 1.55363 |
| 15 | 4.33621 | 37 | 6.26897 | 58 | 1.28199 |
| 16 | 4.54875 | 38 | 6.40383 | 59 | 0.94548 |
| 17 | 4.77212 | 39 | 6.45338 | 60 | 0.58121 |
| 18 | 5.03895 | 40 | 6.42061 | 61 | 0.28157 |
| 19 | 5.37594 | 41 | 6.29969 | 62 | 0.08727 |

-continued

| Coord. | δ | Coord. | δ | Coord. | δ |
|---|---|---|---|---|---|
| 20 | 5.74883 | 42 | 6.07744 | 63 | 0.00000 |
| 21 | 6.07744, and | | | | | wherein said diffractive grating divides said incident beam into nine beams.

6. A beam splitting element, which comprising:

a transparent substrate; and a diffractive grating formed on said substrate for dividing an incident beam into a plurality of diffracted beams, said diffractive grating having a corrugated surface having a plurality of phase patterns arranged in parallel at a predetermined fixed pitch, wherein each of said plurality of phase patterns is formed such that a phase difference δ (unit: radian) at a coordinate (Coord.) falls within an allowable range around a center value indicated in a table below when a width of said phase pattern is divided into 64 coordinates:

| Coord. | δ | Coord. | δ | Coord. | δ |
|---|---|---|---|---|---|
| 0 | 0.55035 | 22 | 5.40090 | 43 | 4.46845 |
| 1 | 0.47385 | 23 | 7.07890 | 44 | 4.30615 |
| 2 | 0.33730 | 24 | 7.48005 | 45 | 4.13665 |
| 3 | 0.18130 | 25 | 7.67005 | 46 | 3.91935 |
| 4 | 0.05650 | 26 | 7.83650 | 47 | 3.61435 |
| 5 | 0.00000 | 27 | 8.01900 | 48 | 3.19015 |
| 6 | 0.02905 | 28 | 8.23470 | 49 | 2.70165 |
| 7 | 0.16455 | 29 | 8.46370 | 50 | 2.26785 |
| 8 | 0.42500 | 30 | 8.66000 | 51 | 1.91135 |
| 9 | 0.80350 | 31 | 8.76950 | 52 | 1.57925 |
| 10 | 1.21375 | 32 | 8.76950 | 53 | 1.21375 |
| 11 | 1.57925 | 33 | 8.66000 | 54 | 0.80350 |
| 12 | 1.91135 | 34 | 8.46370 | 55 | 0.42500 |
| 13 | 2.26785 | 35 | 8.23470 | 56 | 0.16455 |
| 14 | 2.70165 | 36 | 8.01900 | 57 | 0.02905 |
| 15 | 3.19015 | 37 | 7.83650 | 58 | 0.00000 |
| 16 | 3.61435 | 38 | 7.67005 | 59 | 0.05650 |
| 17 | 3.91935 | 39 | 7.48005 | 60 | 0.18130 |
| 18 | 4.13665 | 40 | 7.07890 | 61 | 0.33730 |
| 19 | 4.30615 | 41 | 5.40090 | 62 | 0.47385 |
| 20 | 4.46845 | 42 | 4.69145 | 63 | 0.55035 |
| 21 | 4.69145, and | | | | | wherein said diffractive grating divides said incident beam into eleven beams.

7. A beam splitting element, which comprising:

a transparent substrate; and a diffractive grating formed on said substrate for dividing an incident beam into a plurality of diffracted beams, said diffractive grating having a corrugated surface having a plurality of phase patterns arranged in parallel at a predetermined fixed pitch, wherein each of said plurality of phase patterns is formed such that a phase difference δ (unit: radian) at a coordinate (Coord.) falls within an allowable range around a center value indicated in a table below when a width of said phase pattern is divided into 64 coordinates:

| Coord. | δ | Coord. | δ | Coord. | δ |
|---|---|---|---|---|---|
| 0 | 0.00000 | 22 | 5.41622 | 43 | 6.13950 |
| 1 | 0.15833 | 23 | 5.21037 | 44 | 6.77070 |
| 2 | 0.75073 | 24 | 5.00017 | 45 | 7.20190 |
| 3 | 1.86137 | 25 | 4.76167 | 46 | 7.35715 |
| 4 | 2.33517 | 26 | 4.51136 | 47 | 7.31860 |
| 5 | 2.55480 | 27 | 4.31334 | 48 | 7.08340 |
| 6 | 2.75605 | 28 | 4.21224 | 49 | 6.61767 |
| 7 | 3.08432 | 29 | 4.19796 | 50 | 6.09398 |
| 8 | 3.86142 | 30 | 4.22956 | 51 | 5.72612 |
| 9 | 4.78773 | 31 | 4.25834 | 52 | 5.47112 |
| 10 | 5.21682 | 32 | 4.25834 | 53 | 5.21682 |
| 11 | 5.47112 | 33 | 4.22956 | 54 | 4.78773 |
| 12 | 5.72612 | 34 | 4.19796 | 55 | 3.86142 |
| 13 | 6.09398 | 35 | 4.21224 | 56 | 3.08432 |
| 14 | 6.61767 | 36 | 4.31334 | 57 | 2.75605 |
| 15 | 7.08340 | 37 | 4.51136 | 58 | 2.55480 |
| 16 | 7.31860 | 38 | 4.76167 | 59 | 2.33517 |
| 17 | 7.35715 | 39 | 5.00017 | 60 | 1.86137 |
| 18 | 7.20190 | 40 | 5.21037 | 61 | 0.75073 |
| 19 | 6.77070 | 41 | 5.41622 | 62 | 0.15833 |
| 20 | 6.13950 | 42 | 5.68672 | 63 | 0.00000 |
| 21 | 5.68672, and | | | | | wherein said diffractive grating divides said incident beam into thirteen beams.

8. A beam splitting element, which comprising:

a transparent substrate; and a diffractive grating formed on said substrate for dividing an incident beam into a plurality of diffracted beams, said diffractive grating having a corrugated surface having a plurality of phase patterns arranged in parallel at a predetermined fixed pitch, wherein each of said plurality of phase patterns is formed such that a phase difference δ (unit: radian) at a coordinate (Coord.) falls within an allowable range around a center value indicated in a table below when a width of said phase pattern is divided into 64 coordinates:

| Coord. | δ | Coord. | δ | Coord. | δ |
|---|---|---|---|---|---|
| 0 | 0.00000 | 22 | 6.57449 | 43 | 5.84407 |
| 1 | 0.13568 | 23 | 6.52634 | 44 | 5.77096 |
| 2 | 0.44834 | 24 | 6.76652 | 45 | 5.70160 |
| 3 | 0.88163 | 25 | 7.51678 | 46 | 5.73259 |
| 4 | 1.30576 | 26 | 8.17152 | 47 | 5.86992 |
| 5 | 1.68261 | 27 | 8.33066 | 48 | 6.00010 |
| 6 | 2.06476 | 28 | 8.24053 | 49 | 6.05069 |
| 7 | 2.58479 | 29 | 7.93941 | 50 | 6.01035 |
| 8 | 3.41429 | 30 | 7.43741 | 51 | 5.82002 |
| 9 | 4.25901 | 31 | 6.90008 | 52 | 5.24391 |
| 10 | 4.76903 | 32 | 6.42146 | 53 | 4.21766 |
| 11 | 5.10604 | 33 | 5.81404 | 54 | 3.68439 |
| 12 | 5.38589 | 34 | 4.94279 | 55 | 3.40442 |
| 13 | 5.70998 | 35 | 4.37965 | 56 | 3.14066 |
| 14 | 6.36406 | 36 | 4.15254 | 57 | 2.74639 |
| 15 | 7.67823 | 37 | 4.10114 | 58 | 2.05398 |
| 16 | 8.23179 | 38 | 4.20216 | 59 | 1.25189 |
| 17 | 8.42421 | 39 | 4.57064 | 60 | 0.73750 |
| 18 | 8.48698 | 40 | 5.25321 | 61 | 0.40096 |
| 19 | 8.42208 | 41 | 5.70212 | 62 | 0.16205 |
| 20 | 8.03894 | 42 | 5.84742 | 63 | 0.02012 |
| 21 | 7.05405, and | | | | | wherein said diffractive grating divides said incident beam into fifteen beams.

9. A beam splitting element, which comprising:

a transparent substrate; and a diffractive grating formed on said substrate for dividing an incident beam into a plurality of diffracted beams, said diffractive grating having a corrugated surface having a plurality of phase patterns arranged in parallel at a predetermined fixed pitch, wherein each of said plurality of phase patterns is formed such that a phase difference δ (unit: radian) at a coordinate (Coord.) falls within an allowable range around a center value indicated in a table below when a width of said phase pattern is divided into 64 coordinates:

| Coord. | δ | Coord. | δ | Coord. | δ |
|---|---|---|---|---|---|
| 0 | 2.03700 | 22 | 4.31850 | 43 | 5.99500 |
| 1 | 1.82850 | 23 | 4.25400 | 44 | 6.05700 |
| 2 | 1.40900 | 24 | 4.45850 | 45 | 5.85150 |
| 3 | 0.87800 | 25 | 4.96000 | 46 | 5.35650 |
| 4 | 0.43050 | 26 | 5.65950 | 47 | 4.60500 |
| 5 | 0.13400 | 27 | 6.17350 | 48 | 3.96350 |
| 6 | 0.00000 | 28 | 6.58600 | 49 | 3.43500 |
| 7 | 0.07350 | 29 | 7.32500 | 50 | 2.83450 |
| 8 | 0.40250 | 30 | 8.39250 | 51 | 2.19400 |
| 9 | 0.87750 | 31 | 8.75100 | 52 | 1.69400 |
| 10 | 1.29800 | 32 | 8.75100 | 53 | 1.29800 |
| 11 | 1.69400 | 33 | 8.39250 | 54 | 0.87750 |
| 12 | 2.19400 | 34 | 7.32500 | 55 | 0.40250 |
| 13 | 2.83450 | 35 | 6.58600 | 56 | 0.07350 |
| 14 | 3.4350Q | 36 | 6.17350 | 57 | 0.00000 |
| 15 | 3.96350 | 37 | 5.65950 | 58 | 0.13400 |
| 16 | 4.60500 | 38 | 4.96000 | 59 | 0.43050 |
| 17 | 5.35650 | 39 | 4.45850 | 60 | 0.87800 |
| 18 | 5.85150 | 40 | 4.25400 | 61 | 1.40900 |
| 19 | 6.05700 | 41 | 4.31850 | 62 | 1.82850 |
| 20 | 5.99500 | 42 | 5.14850 | 63 | 2.03700 |
| 21 | 5.14850, and | | | | | wherein said diffractive grating divides said incident beam into seventeen beams.

10. A beam splitting element, which comprises:

a transparent substrate; and a diffractive grating formed on said substrate for dividing an incident beam into a plurality of diffracted beams, said diffractive grating having a corrugated surface having a plurality of phase patterns arranged in parallel at a predetermined fixed pitch, wherein each of a plurality of phase patterns is formed such that a phase difference δ (unit: radian) at a coordinate (Coord.) falls within an allowable range around a center value indicated in a table below when a width of said phase pattern is divided into 64 coordinates:

| Coord. | δ | Coord. | δ | Coord. | δ |
|---|---|---|---|---|---|
| 0 | 6.20469 | 22 | 0.81724 | 43 | 0.31944 |
| 1 | 6.19885 | 23 | 0.80640 | 44 | 0.78802 |
| 2 | 6.05305 | 24 | 0.97404 | 45 | 1.32005 |
| 3 | 5.84840 | 25 | 1.34720 | 46 | 1.71562 |
| 4 | 5.61804 | 26 | 1.80715 | 47 | 1.92310 |
| 5 | 5.37195 | 27 | 2.14144 | 48 | 2.00003 |
| 6 | 5.11073 | 28 | 2.27186 | 49 | 2.01844 |
| 7 | 4.83414 | 29 | 2.24177 | 50 | 2.02938 |
| 8 | 4.54602 | 30 | 2.11918 | 51 | 2.06480 |
| 9 | 4.24744 | 31 | 1.94671 | 52 | 2.14885 |
| 10 | 3.94333 | 32 | 1.74459 | 53 | 2.28976 |
| 11 | 3.63568 | 33 | 1.52525 | 54 | 2.47194 |
| 12 | 3.32893 | 34 | 1.29444 | 55 | 2.65742 |
| 13 | 3.02473 | 35 | 1.05910 | 56 | 2.81005 |
| 14 | 2.72197 | 36 | 0.82553 | 57 | 2.91871 |
| 15 | 2.42525 | 37 | 0.60057 | 58 | 3.00825 |
| 16 | 2.13518 | 38 | 0.39240 | 59 | 3.15835 |
| 17 | 1.85663 | 39 | 0.20938 | 60 | 3.50412 |
| 18 | 1.59221 | 40 | 0.06762 | 61 | 4.21062 |
| 19 | 1.34606 | 41 | 0.00000 | 62 | 5.19568 |
| 20 | 1.12405 | 42 | 0.06089 | 63 | 5.92340 |
| 21 | 0.93984, and | | | | | wherein said diffractive grating divides said incident beam into eight beams.

11. A beam splitting element, which comprises:

a transparent substrate; and a diffractive grating formed on said substrate for dividing an incident beam into a plurality of diffracted beams, said diffractive grating having a corrugated surface having a plurality of phase patterns arranged in parallel at a predetermined fixed pitch, wherein each of said plurality of phase patterns is formed such that a phase difference δ (unit: radian) at a coordinate (Coord.) falls within an allowable range around a center value indicated in a table below when a width of said phase pattern is divided into 64 coordinates:

| Coord. | δ | Coord. | δ | Coord. | δ |
|---|---|---|---|---|---|
| 0 | 2.42003 | 22 | 0.20292 | 43 | 0.36133 |
| 1 | 2.41737 | 23 | 0.15027 | 44 | 0.47917 |
| 2 | 2.41069 | 24 | 0.10930 | 45 | 0.63686 |
| 3 | 2.40101 | 25 | 0.07753 | 46 | 0.83806 |
| 4 | 2.38624 | 26 | 0.05235 | 47 | 1.08038 |
| 5 | 2.36743 | 27 | 0.03354 | 48 | 1.33990 |
| 6 | 2.34275 | 28 | 0.01928 | 49 | 1.58172 |
| 7 | 2.31098 | 29 | 0.00960 | 50 | 1.78342 |
| 8 | 2.27002 | 30 | 0.00291 | 51 | 1.93962 |
| 9 | 2.21736 | 31 | 0.00000 | 52 | 2.05945 |
| 10 | 2.14912 | 32 | 0.00000 | 53 | 2.14912 |
| 11 | 2.05945 | 33 | 0.00291 | 54 | 2.21736 |
| 12 | 1.93962 | 34 | 0.00960 | 55 | 2.27002 |
| 13 | 1.78342 | 35 | 0.01928 | 56 | 2.31098 |
| 14 | 1.58172 | 36 | 0.03354 | 57 | 2.34275 |
| 15 | 1.33990 | 37 | 0.05235 | 58 | 2.36743 |
| 16 | 1.08038 | 38 | 0.07753 | 59 | 2.38624 |
| 17 | 0.83806 | 39 | 0.10930 | 60 | 2.40101 |
| 18 | 0.63686 | 40 | 0.15027 | 61 | 2.41069 |
| 19 | 0.47917 | 41 | 0.20292 | 62 | 2.41737 |
| 20 | 0.36133 | 42 | 0.27067 | 63 | 2.42003 |
| 21 | 0.27067, and | | | | | wherein said diffractive grating divides said incident beam into three beams.

12. A beam splitting element, which comprises:

a transparent substrate; and a diffractive grating formed on said substrate for dividing an incident beam into a plurality of diffracted beams, said diffractive grating having a corrugated surface having a plurality of phase patterns arranged in parallel at a predetermined fixed pitch, wherein each of said plurality of phase patterns is formed such that a phase difference δ (unit: radian) at a coordinate (Coord.) falls within an allowable range around a center value indicated in a table below when a width of said phase pattern is divided into 64 coordinates:

| Coord. | δ | Coord. | δ | Coord. | δ |
|---|---|---|---|---|---|
| 0 | 4.56329 | 22 | 1.93737 | 43 | 2.10049 |
| 1 | 4.52405 | 23 | 1.79889 | 44 | 2.15274 |
| 2 | 4.43502 | 24 | 1.59145 | 45 | 2.19579 |
| 3 | 4.27650 | 25 | 1.28629 | 46 | 2.23209 |
| 4 | 4.02036 | 26 | 0.90202 | 47 | 2.26556 |
| 5 | 3.66165 | 27 | 0.54281 | 48 | 2.29785 |
| 6 | 3.27762 | 28 | 0.28691 | 49 | 2.33108 |
| 7 | 2.97196 | 29 | 0.12889 | 50 | 2.36813 |
| 8 | 2.7452 | 30 | 0.03937 | 51 | 2.40992 |
| 9 | 2.62604 | 31 | 0.00000 | 52 | 2.46267 |
| 10 | 2.53167 | 32 | 0.00000 | 53 | 2.53167 |
| 11 | 2.46267 | 33 | 0.03937 | 54 | 2.62604 |
| 12 | 2.40992 | 34 | 0.12889 | 55 | 2.76452 |
| 13 | 2.36813 | 35 | 0.28691 | 56 | 2.97196 |
| 14 | 2.33108 | 36 | 0.54281 | 57 | 3.27762 |
| 15 | 2.29785 | 37 | 0.90202 | 58 | 3.66165 |
| 16 | 2.26556 | 38 | 1.28629 | 59 | 4.02036 |
| 17 | 2.23209 | 39 | 1.59145 | 60 | 4.27650 |
| 18 | 2.19579 | 40 | 1.79889 | 61 | 4.43502 |
| 19 | 2.15274 | 41 | 1.93737 | 62 | 4.52405 |
| 20 | 2.10049 | 42 | 2.03199 | 63 | 4.56329 |
| 21 | 2.03199, and | | | | | wherein said diffractive grating divides said incident beam into five beams.

13. A beam splitting element, which comprising:

a transparent substrate; and a diffractive grating formed on said substrate for dividing an incident beam into a plurality of diffracted beams, said diffractive grating having a corrugated surface having a plurality of phase patterns arranged in parallel at a predetermined fixed pitch, wherein each of said plurality of phase patterns is formed such that a phase difference δ (unit: radian) at a coordinate (Coord.) falls within an allowable range around a center value indicated in a table below when a width of said phase pattern is divided into 64 coordinates:

| Coord. | δ | Coord. | δ | Coord. | δ |
|---|---|---|---|---|---|
| 0 | 6.18521 | 22 | 1.29052 | 43 | 1.48538 |
| 1 | 6.13494 | 23 | 1.17510 | 44 | 1.58377 |
| 2 | 6.03514 | 24 | 1.03683 | 45 | 1.70976 |
| 3 | 5.88700 | 25 | 0.87138 | 46 | 1.92059 |
| 4 | 5.70273 | 26 | 0.68174 | 47 | 2.47896 |
| 5 | 5.50372 | 27 | 0.48273 | 48 | 3.70700 |
| 6 | 5.31308 | 28 | 0.29795 | 49 | 4.26436 |
| 7 | 5.14763 | 29 | 0.14982 | 50 | 4.47470 |
| 8 | 5.00935 | 30 | 0.05002 | 51 | 4.60069 |
| 9 | 4.89343 | 31 | 0.00000 | 52 | 4.69908 |
| 10 | 4.79319 | 32 | 0.00000 | 53 | 4.79319 |
| 11 | 4.69908 | 33 | 0.05002 | 54 | 4.89343 |
| 12 | 4.60069 | 34 | 0.14982 | 55 | 5.00935 |
| 13 | 4.47470 | 35 | 0.29795 | 56 | 5.14763 |
| 14 | 4.26436 | 36 | 0.48273 | 57 | 5.31308 |
| 15 | 3.70700 | 37 | 0.68174 | 58 | 5.50372 |
| 16 | 2.47896 | 38 | 0.87138 | 59 | 5.70273 |
| 17 | 1.92059 | 39 | 1.03683 | 60 | 5.88700 |
| 18 | 1.70976 | 40 | 1.17510 | 61 | 6.03514 |
| 19 | 1.58377 | 41 | 1.29052 | 62 | 6.13494 |
| 20 | 1.48538 | 42 | 1.39077 | 63 | 6.18521 |
| 21 | 1.39077, and | | | | | wherein said diffractive grating divides said incident beam into seven beams.

14. A beam splitting element, which comprising:

a transparent substrate; and a diffractive grating formed on said substrate for dividing an incident beam into a plurality of diffracted beams, said diffractive grating having a corrugated surface having a plurality of phase patterns arranged in parallel at a predetermined fixed pitch, wherein each of said plurality of phase patterns is formed such that a phase difference δ (unit: radian) at a coordinate (Coord.) falls within an allowable range around a center value indicated in a table below when a width of said phase pattern is divided into 64 coordinates:

| Coord. | δ | Coord. | δ | Coord. | δ |
|---|---|---|---|---|---|
| 0 | 6.45338 | 22 | 0.15369 | 43 | 0.70455 |
| 1 | 6.36611 | 23 | 0.03277 | 44 | 1.07744 |
| 2 | 6.17181 | 24 | 0.00000 | 45 | 1.41443 |
| 3 | 5.87217 | 25 | 0.04955 | 46 | 1.68126 |
| 4 | 5.50790 | 26 | 0.18441 | 47 | 1.90463 |
| 5 | 5.17139 | 27 | 0.40890 | 48 | 2.11717 |
| 6 | 4.89975 | 28 | 0.67712 | 49 | 2.35803 |
| 7 | 4.67630 | 29 | 0.91799 | 50 | 2.66487 |
| 8 | 4.46352 | 30 | 1.07669 | 51 | 3.06736 |
| 9 | 4.22610 | 31 | 1.15367 | 52 | 3.52225 |
| 10 | 3.92236 | 32 | 1.15367 | 53 | 3.92236 |
| 11 | 3.52225 | 33 | 1.07669 | 54 | 4.22610 |
| 12 | 3.06736 | 34 | 0.91799 | 55 | 4.46352 |
| 13 | 2.66487 | 35 | 0.67712 | 56 | 4.67630 |
| 14 | 2.35803 | 36 | 0.40890 | 57 | 4.89975 |
| 15 | 2.11717 | 37 | 0.18441 | 58 | 5.17139 |
| 16 | 1.90463 | 38 | 0.04955 | 59 | 5.50790 |
| 17 | 1.68126 | 39 | 0.00000 | 60 | 5.87217 |
| 18 | 1.41443 | 40 | 0.03277 | 61 | 6.17181 |
| 19 | 1.07744 | 41 | 0.15369 | 62 | 6.36611 |
| 20 | 0.70455 | 42 | 0.37594 | 63 | 6.45338 |
| 21 | 0.37594, and | | | | | wherein said diffractive grating divides said incident beam into nine beams.

15. A beam splitting element, which comprising:

a transparent substrate; and a diffractive grating formed on said substrate for dividing an incident beam into a plurality of diffracted beams, said diffractive grating having a corrugated surface having a plurality of phase patterns arranged in parallel at a predetermined fixed pitch, wherein each of said plurality of phase patterns is formed such that a phase difference δ (unit: radian) at a coordinate (Coord.) falls within an allowable range around a center value indicated in a table below when a width of said phase pattern is divided into 64 coordinates:

| Coord. | δ | Coord. | δ | Coord. | δ |
|---|---|---|---|---|---|
| 0 | 8.21915 | 22 | 3.36860 | 43 | 4.30105 |
| 1 | 8.29565 | 23 | 1.69060 | 44 | 4.46335 |
| 2 | 8.43220 | 24 | 1.28945 | 45 | 4.63285 |
| 3 | 8.58820 | 25 | 1.09945 | 46 | 4.85015 |
| 4 | 8.71300 | 26 | 0.93300 | 47 | 5.15515 |
| 5 | 8.76950 | 27 | 0.75050 | 48 | 5.57935 |
| 6 | 8.74045 | 28 | 0.53480 | 49 | 6.06785 |
| 7 | 8.60495 | 29 | 0.30580 | 50 | 6.50165 |
| 8 | 8.34450 | 30 | 0.10950 | 51 | 6.85815 |
| 9 | 7.96600 | 31 | 0.00000 | 52 | 7.19025 |
| 10 | 7.55575 | 32 | 0.00000 | 53 | 7.55575 |
| 11 | 7.19025 | 33 | 0.10950 | 54 | 7.96690 |
| 12 | 6.85815 | 34 | 0.30580 | 55 | 8.34450 |
| 13 | 6.50165 | 35 | 0.53480 | 56 | 8.60495 |

-continued

| Coord. | δ | Coord. | δ | Coord. | δ |
|---|---|---|---|---|---|
| 14 | 6.06785 | 36 | 0.75050 | 57 | 8.74045 |
| 15 | 5.57935 | 37 | 0.93300 | 58 | 8.76950 |
| 16 | 5.15515 | 38 | 1.09945 | 59 | 8.71300 |
| 17 | 4.85015 | 39 | 1.28945 | 60 | 8.58820 |
| 18 | 4.63285 | 40 | 1.69060 | 61 | 8.43220 |
| 19 | 4.46335 | 41 | 3.36860 | 62 | 8.29565 |
| 20 | 4.30105 | 42 | 4.07805 | 63 | 8.21915 |
| 21 | 4.07805, and | | | | | wherein said diffractive grating divides said incident beam into eleven beams.

16. A beam splitting element, which comprising:

a transparent substrate; and a diffractive grating formed on said substrate for dividing an incident beam into a plurality of diffracted beams, said diffractive grating having a corrugated surface having a plurality of phase patterns arranged in parallel at a predetermined fixed pitch, wherein each of said plurality of phase patterns is formed such that a phase difference δ (unit: radian) at a coordinate (Coord.) falls within an allowable range around a center value indicated in a table below when a width of said phase pattern is divided into 64 coordinates:

| Coord. | δ | Coord. | δ | Coord. | δ |
|---|---|---|---|---|---|
| 0 | 7.35715 | 22 | 1.94093 | 43 | 1.21765 |
| 1 | 7.19882 | 23 | 2.14678 | 44 | 0.58645 |
| 2 | 6.60642 | 24 | 2.35698 | 45 | 0.15525 |
| 3 | 5.49578 | 25 | 2.59548 | 46 | 0.00000 |
| 4 | 5.02198 | 26 | 2.84579 | 47 | 0.03855 |
| 5 | 4.80235 | 27 | 3.04381 | 48 | 0.27375 |
| 6 | 4.60110 | 28 | 3.14491 | 49 | 0.73948 |
| 7 | 4.27283 | 29 | 3.15919 | 50 | 1.26317 |
| 8 | 3.49573 | 30 | 3.12759 | 51 | 1.63103 |
| 9 | 2.56942 | 31 | 3.09881 | 52 | 1.88603 |
| 10 | 2.14033 | 32 | 3.09881 | 53 | 2.14033 |
| 11 | 1.88603 | 33 | 3.12759 | 54 | 2.56942 |
| 12 | 1.63103 | 34 | 3.15919 | 55 | 3.49573 |
| 13 | 1.26317 | 35 | 3.14491 | 56 | 4.27283 |
| 14 | 0.73948 | 36 | 3.04381 | 57 | 4.60110 |
| 15 | 0.27375 | 37 | 2.84579 | 58 | 4.80235 |
| 16 | 0.03855 | 38 | 2.59548 | 59 | 5.02198 |
| 17 | 0.00000 | 39 | 2.35698 | 60 | 5.49578 |
| 18 | 0.15525 | 40 | 2.14678 | 61 | 6.60642 |
| 19 | 0.58645 | 41 | 1.94093 | 62 | 7.19882 |
| 20 | 1.21765 | 42 | 1.67043 | 63 | 7.35715 |
| 21 | 1.67043, and | | | | | wherein said diffractive grating divides said incident beam into thirteen beams.

17. A beam splitting element, which comprising:

a transparent substrate; and a diffractive grating formed on said substrate for dividing an incident beam into a plurality of diffracted beams, said diffractive grating having a corrugated surface having a plurality of phase patterns arranged in parallel at a predetermined fixed pitch, wherein each of said plurality of phase patterns is formed such that a phase difference δ (unit: radian) at a coordinate (Coord.) falls within an allowable range around a center value indicated in a table below when a width of said phase pattern is divided into 64 coordinates:

| Coord. | δ | Coord. | δ | Coord. | δ |
|---|---|---|---|---|---|
| 0 | 8.48698 | 22 | 1.91249 | 43 | 2.64291 |
| 1 | 8.35130 | 23 | 1.96064 | 44 | 2.71602 |
| 2 | 8.03864 | 24 | 1.72046 | 45 | 2.78538 |
| 3 | 7.60535 | 25 | 0.97020 | 46 | 2.75439 |
| 4 | 7.18122 | 26 | 0.31546 | 47 | 2.61706 |
| 5 | 6.80437 | 27 | 0.15632 | 48 | 2.48688 |
| 6 | 6.42222 | 28 | 0.24645 | 49 | 2.43629 |
| 7 | 5.90219 | 29 | 0.54757 | 50 | 2.47663 |
| 8 | 5.07269 | 30 | 1.04957 | 51 | 2.66696 |
| 9 | 4.22797 | 31 | 1.58690 | 52 | 3.24307 |
| 10 | 3.71795 | 32 | 2.06552 | 53 | 4.26932 |
| 11 | 3.38094 | 33 | 2.67294 | 54 | 4.80259 |
| 12 | 3.10109 | 34 | 3.54419 | 55 | 5.08256 |
| 13 | 2.77700 | 35 | 4.10733 | 56 | 5.34632 |
| 14 | 2.12292 | 36 | 4.33444 | 57 | 5.74059 |
| 15 | 0.80875 | 37 | 4.38584 | 58 | 6.43300 |
| 16 | 0.25519 | 38 | 4.28482 | 59 | 7.23509 |
| 17 | 0.06277 | 39 | 3.91634 | 60 | 7.74948 |
| 18 | 0.00000 | 40 | 3.23377 | 61 | 8.08602 |
| 19 | 0.06490 | 41 | 2.78486 | 62 | 8.32493 |
| 20 | 0.44804 | 42 | 2.63956 | 63 | 8.46686 |
| 21 | 1.43293, and | | | | | wherein said diffractive grating divides said incident beam into fifteen beams.

18. A beam splitting element, which comprising:

a transparent substrate; and a diffractive grating formed on said substrate for dividing an incident beam into a plurality of diffracted beams, said diffractive grating having a corrugated surface having a plurality of phase patterns arranged in parallel at a predetermined fixed pitch, wherein each of said plurality of phase patterns is formed such that said phase difference δ (unit: radian) at a coordinate (Coord.) falls within an allowable range around a center value indicated in a table below when a width of said phase pattern is divided into 64 coordinates:

| Coord. | δ | Coord. | δ | Coord. | δ |
|---|---|---|---|---|---|
| 0 | 6.71400 | 22 | 4.43250 | 43 | 2.75600 |
| 1 | 6.92250 | 23 | 4.49700 | 44 | 2.69400 |
| 2 | 7.34200 | 24 | 4.29250 | 45 | 2.89950 |
| 3 | 7.87300 | 25 | 3.79100 | 46 | 3.39450 |
| 4 | 8.32050 | 26 | 3.09150 | 47 | 4.14600 |
| 5 | 8.61700 | 27 | 2.57750 | 48 | 4.78750 |
| 6 | 8.75100 | 28 | 2.16500 | 49 | 5.31600 |
| 7 | 8.67750 | 29 | 1.42600 | 50 | 5.91650 |
| 8 | 8.34850 | 30 | 0.35850 | 51 | 6.55700 |
| 9 | 7.87350 | 31 | 0.00000 | 52 | 7.05700 |
| 10 | 7.45300 | 32 | 0.00000 | 53 | 7.45300 |
| 11 | 7.05700 | 33 | 0.35850 | 54 | 7.87350 |
| 12 | 6.55700 | 34 | 1.42600 | 55 | 8.34850 |
| 13 | 5.91650 | 35 | 2.16500 | 56 | 8.67750 |
| 14 | 5.31600 | 36 | 2.57750 | 57 | 8.75100 |
| 15 | 4.78750 | 37 | 3.09150 | 58 | 8.61700 |
| 16 | 4.14600 | 38 | 3.79100 | 59 | 8.32050 |
| 17 | 3.39450 | 39 | 4.29250 | 60 | 7.87300 |
| 18 | 2.89950 | 40 | 4.49700 | 61 | 7.34200 |
| 19 | 2.69400 | 41 | 4.43250 | 62 | 6.92250 |
| 20 | 2.75600 | 42 | 3.60250 | 63 | 6.71400 |
| 21 | 3.60250 and | | | | | wherein said diffractive grating divides said incident beam into seventeen beams.

* * * * *